United States Patent
Shimazaki et al.

[11] Patent Number: 6,043,853
[45] Date of Patent: Mar. 28, 2000

[54] APPARATUS AND METHOD FOR EMPHASIZING AN OUTLINE OF A VIDEO SIGNAL

[75] Inventors: Shingo Shimazaki; Takashi Asaida; Takashi Kameyama, all of Kanagawa; Yoshiaki Satou, Tokyo, all of Japan

[73] Assignee: Sony Corporation, Tokyo, Japan

[21] Appl. No.: 08/838,316

[22] Filed: Apr. 8, 1997

[30] Foreign Application Priority Data

Apr. 12, 1996 [JP] Japan ................................. 8-115697

[51] Int. Cl.[7] ............................................... H04N 5/208
[52] U.S. Cl. .......................... 348/625; 348/252; 348/253; 348/607
[58] Field of Search ........................... 348/625, 607, 348/609, 624, 630, 252, 253; 382/266, 263; H04N 5/208

[56] References Cited

U.S. PATENT DOCUMENTS

| | | | |
|---|---|---|---|
| 4,463,381 | 7/1984 | Powell et al. | 348/625 |
| 4,506,293 | 3/1985 | Hurst, Jr. | 348/630 |
| 4,621,290 | 11/1986 | Fling | 348/625 |
| 4,636,863 | 1/1987 | Kaizaki | 348/619 |
| 4,689,666 | 8/1987 | Hatanaka | 348/624 |
| 4,691,366 | 9/1987 | Fenster et al. | 382/266 |
| 4,736,439 | 4/1988 | May | 382/262 |
| 4,783,840 | 11/1988 | Song | 382/261 |
| 4,839,726 | 6/1989 | Balopole et al. | 348/536 |
| 4,855,829 | 8/1989 | Kihara | 348/627 |
| 5,050,223 | 9/1991 | Sumi | 382/266 |
| 5,087,972 | 2/1992 | Sumi | 348/625 |
| 5,103,299 | 4/1992 | Asaida | 348/264 |
| 5,151,787 | 9/1992 | Park | 348/625 |
| 5,247,352 | 9/1993 | Nagler et al. | 358/515 |
| 5,272,524 | 12/1993 | Nagumo et al. | 348/207 |
| 5,448,309 | 9/1995 | Won | 348/607 |
| 5,521,637 | 5/1996 | Asaida et al. | 348/222 |
| 5,532,756 | 7/1996 | Nishikawa et al. | 348/222 |
| 5,550,936 | 8/1996 | Someya et al. | 382/263 |
| 5,559,563 | 9/1996 | Takahashi et al. | 348/625 |
| 5,574,513 | 11/1996 | Topper | 348/652 |
| 5,602,942 | 2/1997 | Takemoto et al. | 382/263 |
| 5,640,119 | 6/1997 | Bell | 327/309 |
| 5,666,443 | 9/1997 | Kumashiro | 382/266 |
| 5,696,852 | 12/1997 | Minoura et al. | 382/266 |
| 5,699,126 | 12/1997 | Hong | 348/625 |
| 5,767,900 | 6/1998 | Tanji et al. | 348/253 |
| 5,777,689 | 7/1998 | Dunbar | 348/625 |

FOREIGN PATENT DOCUMENTS

| | | |
|---|---|---|
| 3-277089 | 12/1991 | Japan . |
| 6-46444 | 2/1994 | Japan . |
| 6-54232 | 2/1994 | Japan . |
| 6-153217 | 5/1994 | Japan . |

OTHER PUBLICATIONS

PTO 99–1558, English translation of JP 6–178156A, Feb. 1999.

*Primary Examiner*—John K. Peng
*Assistant Examiner*—Linus H. Lo
*Attorney, Agent, or Firm*—Frommer Lawerence & Haug, LLP; William S. Frommer

[57] ABSTRACT

Video camera which emphasizes an outline of a video signal produced thereby. A detail signal of a video image represented by the video signal is generated and which represents a vertical outline emphasis signal. Edges of the video image and burst-like portions of the video signal are detected, and an edge detection signal is generated that corresponds in one manner to the detected edges and that corresponds in another manner to the detected burst portions. The detail signal is adjusted by the edge detection signal or by a cross color suppression signal generated from the vertical outline emphasis signal. The video signal then is modified by the adjusted detail signal so as to produce the outline emphasized video signal. The detail signal may also be adjusted by a gain setting signal that corresponds to the vertical outline emphasis signal and which is compressed in level when the vertical outline emphasis signal is relatively low.

12 Claims, 19 Drawing Sheets

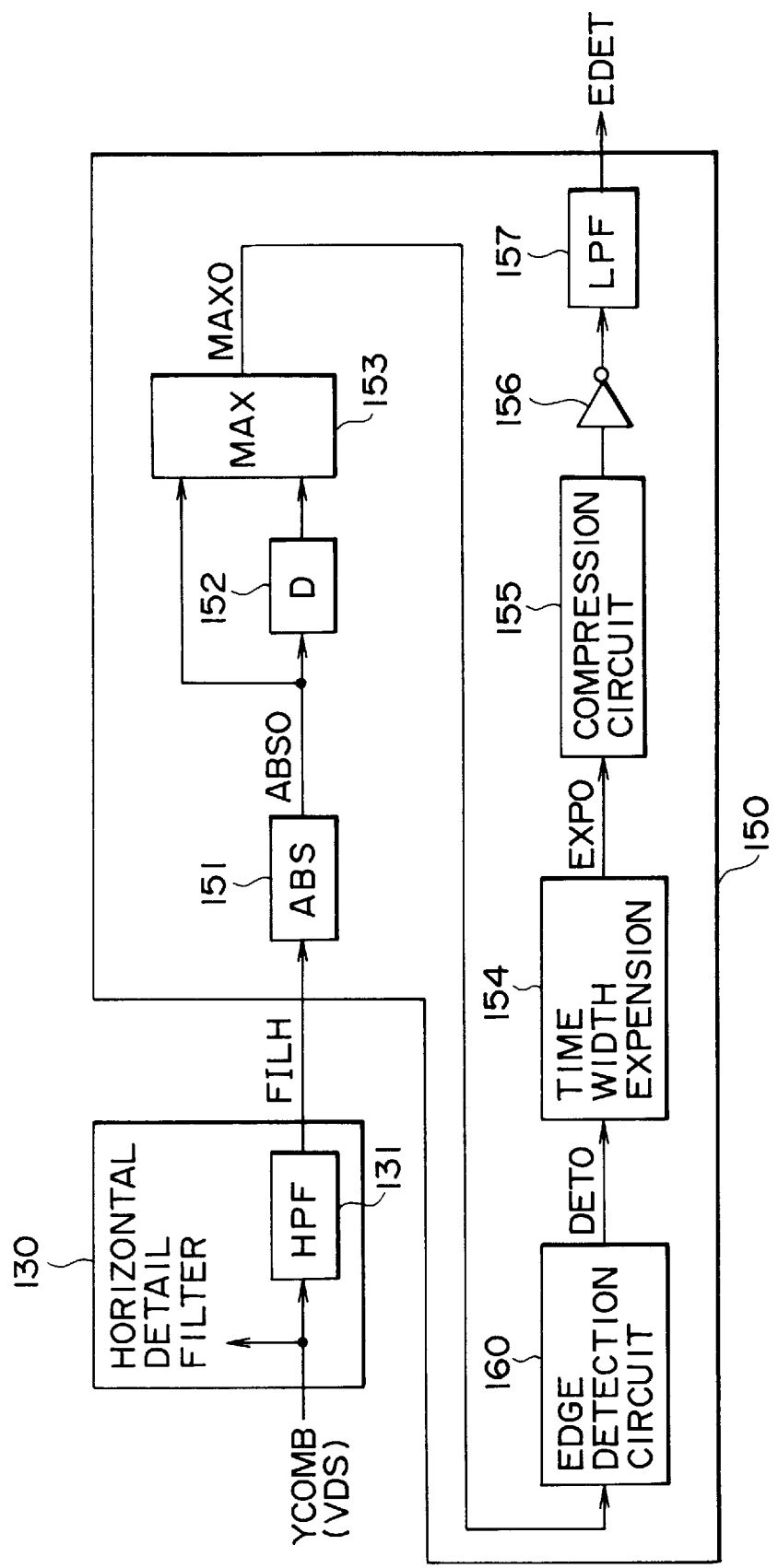

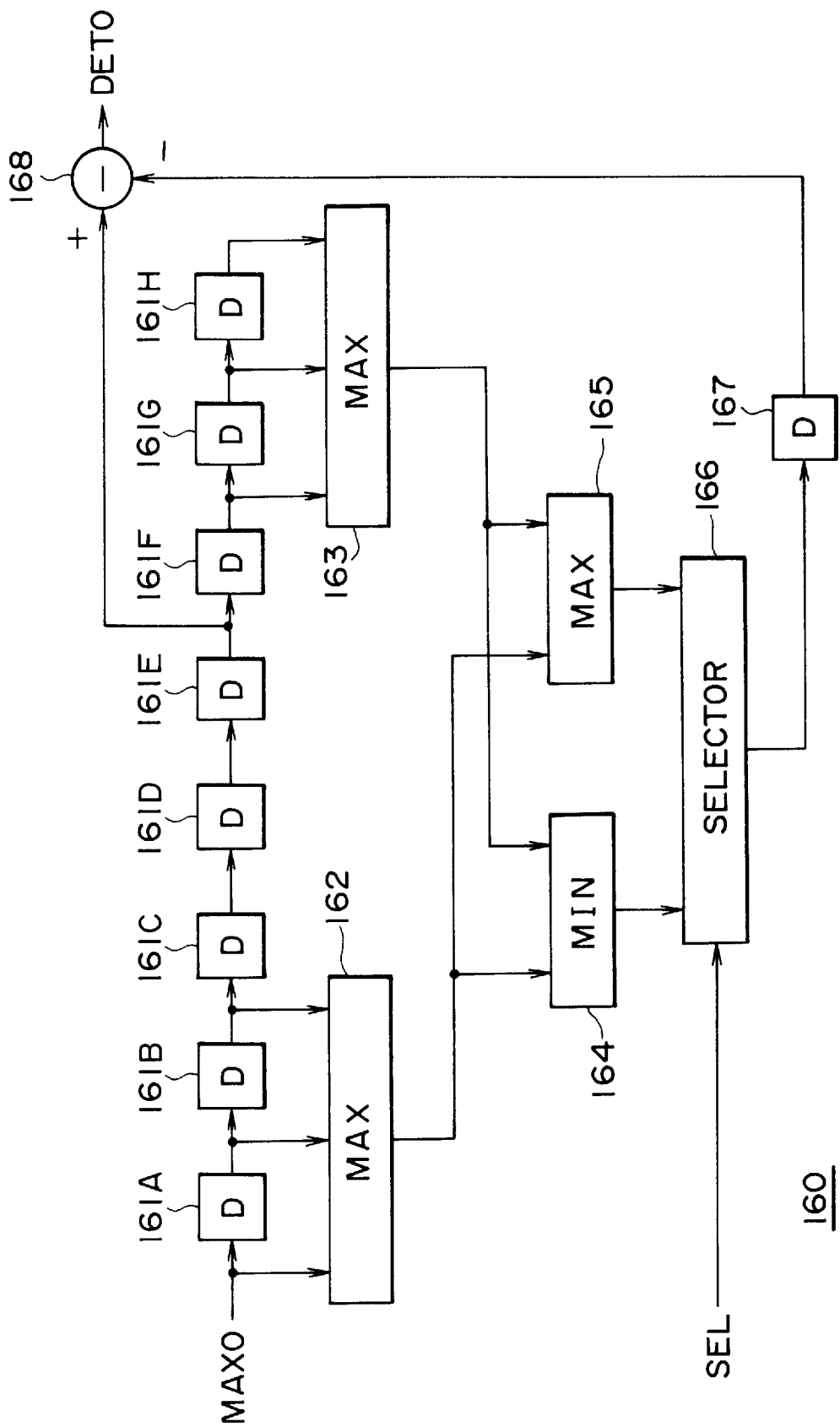

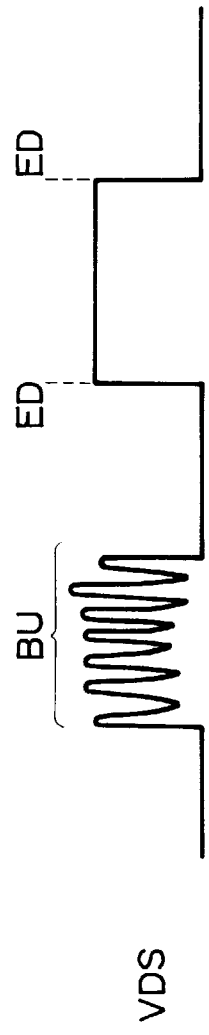
FIG. 11A  VDS
FIG. 11B  FILH
FIG. 11C  ABSO
FIG. 11D  MAXO
FIG. 11E  DETO (MAX)
FIG. 11F  EXPO
FIG. 11G  EDET (GAIN)

F I G. 14A
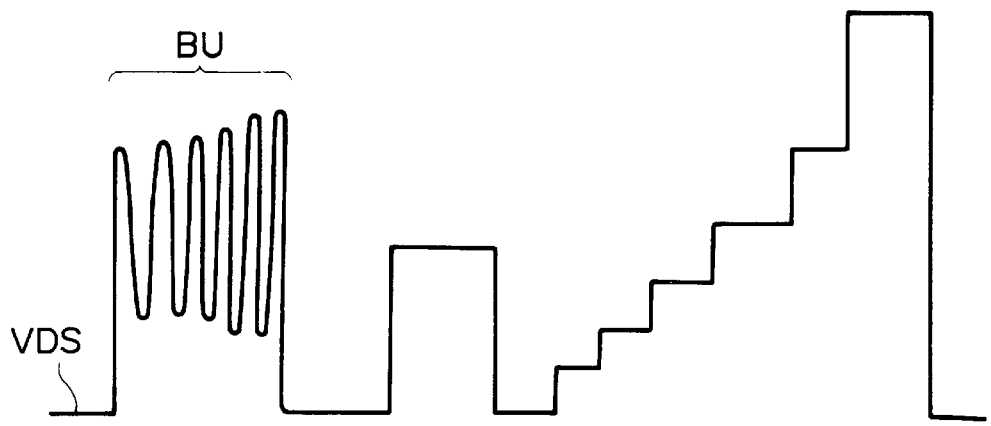
F I G. 14B
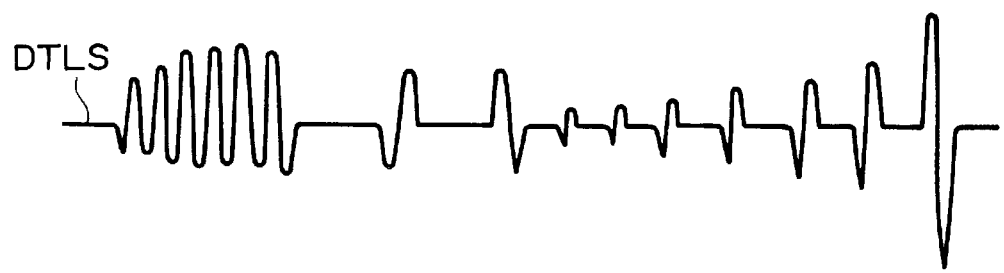
F I G. 14C
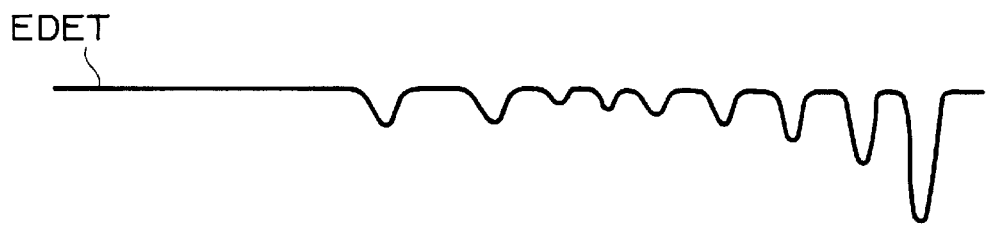

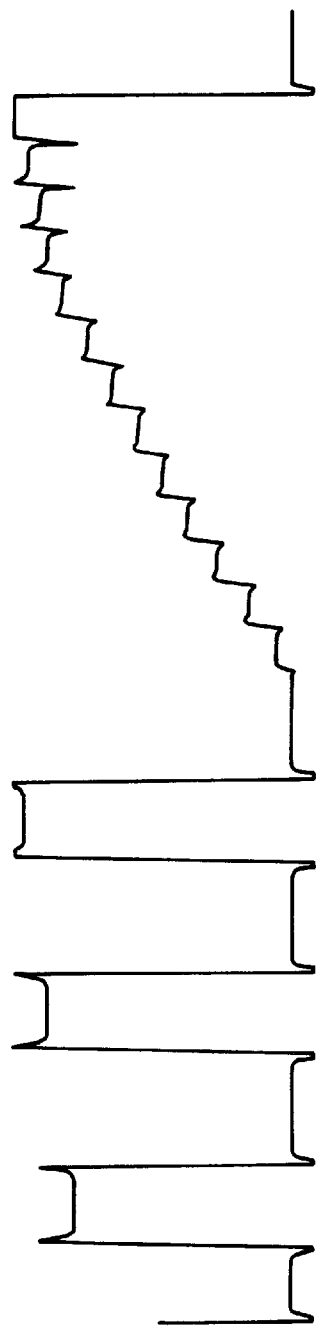
F I G. 15A
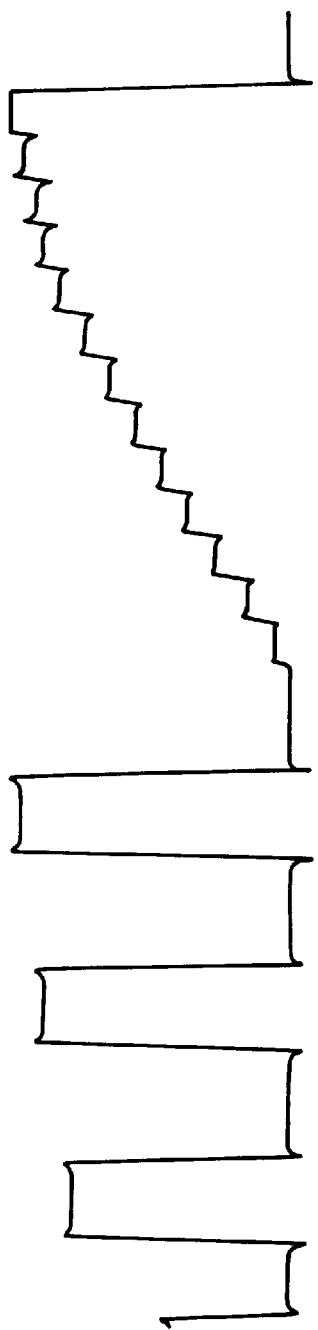
F I G. 15B

FIG. 18D
FIG. 18C
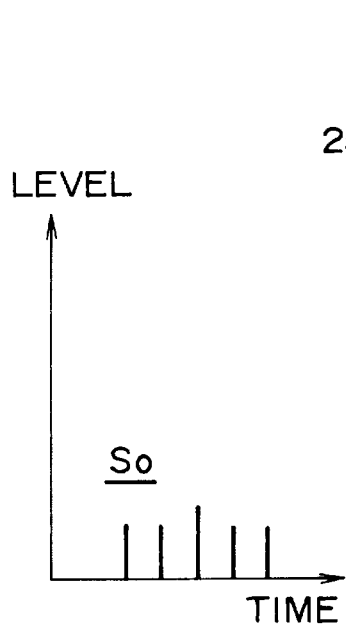
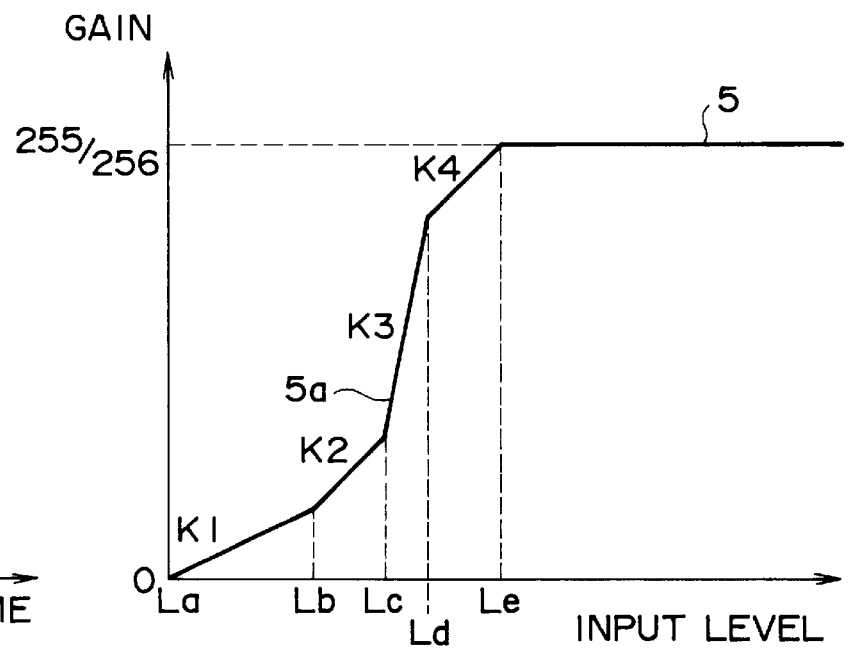
FIG. 18B
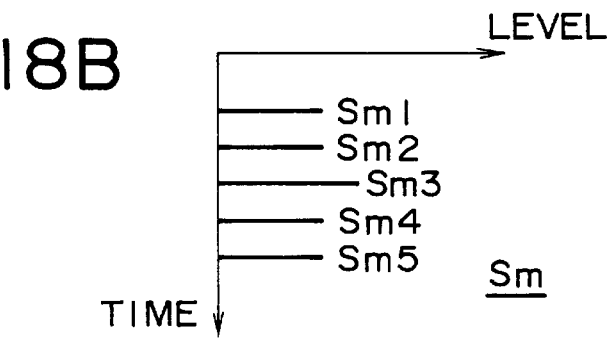
FIG. 18A
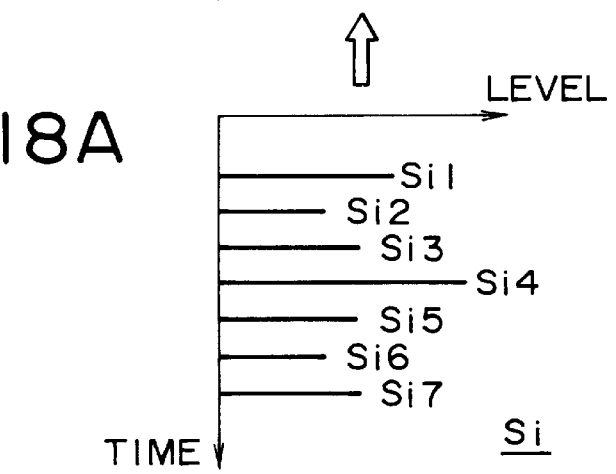

APPARATUS AND METHOD FOR EMPHASIZING AN OUTLINE OF A VIDEO SIGNAL

BACKGROUND OF THE INVENTION

The present invention relates to a video camera and, more particularly, to apparatus and method for emphasizing an outline of a video signal for use in a video camera as well as other video electronic equipment.

As is known, professional video cameras perform various processing of a generated video signal including emphasizing the outlines of images represented therein so as to produce a high quality video output signal. In such video cameras, a subject image is photographed by CCD solid state imaging sensors to produce R (red), G (green) and B (blue) image signals which are then digitized to produce respective R, G and B digital video signals and an outline emphasis signal is produced therefrom that is subsequently added to the video signals. The outline emphasis signal generally increases in size as the level variation of the original signals increase and, thus, the generated outline emphasis signal is relatively large at the image edge points of bright images appearing against a dark background. Subsequently, the addition of the outline emphasis signal to the original signals for bright images produces a resultant image signal having large values at the edges thereof.

Video cameras typically have a dynamic range from −7% on the "black side" to 109% on the "white side", and, as is well-known known, signal levels near the two ends of the dynamic range are clipped during processing and recording thereof. Consequently, very large signal levels of an image signal produced from the addition of the outline emphasis signal thereto also are clipped thus causing the deleterious effect of widening the edges of the images represented by the processed video signal.

Various techniques have been proposed for solving the above-mentioned problem. For example, Japanese laid-open patent application No. 6-46444 proposes to lower the level of the outline emphasis signal when the resultant summed image signal and outline emphasis signal exceeds the dynamic range of the camera. Another technique, proposed in Japanese laid-open patent application 3-277089, suggests to suppress (i.e., not use) the outline emphasis signal for skin colored portions of the image. A further technique, disclosed in Japanese laid-open patent application 6-54232, suggests to add an outline emphasis signal having a low clock rate to the image signal both before and after gamma knee correction for signals having or requiring a relatively low resolution, and to add an outline emphasis signal having a high clock rate to a brightness signal having its clock rate increased using a matrix circuit and the image signal after gamma knee correction when high resolution images are required.

Video cameras currently are known to produce high resolution image signals by spatially shifting by one-half a picture element the R and B image signals horizontally relative to the G image signal, such as previously disclosed in U.S. Pat. No. 5,521,637 and Japanese laid-open patent applications 6-217326 and 6-153217. Still further, it is known to prevent beat interference by coinciding the CCD imaging devices' clock rates to the clock rate of the digitized video signals, such as disclosed in Japanese patent Nos. 6-217326 and 6-153217.

Moreover, Japanese laid-open patent applications 6-217326 and 6-153217 disclose processing the video signals at twice the clock rate of the CCD imaging devices when the aforementioned spatial picture element shift technique is utilized. It also is known to vary the level of a generated outline emphasis signal as a function of the level of the input signal. For example, given an input signal such as shown in FIG. 1A of the drawings and a "gain" characteristic function as shown in FIG. 1B, an output signal as shown in FIG. 1C is produced.

One problem encountered in video cameras and other video processing devices, such as previously discussed, is their general inability to correctly process "burst-like" signals. Namely, outline emphasized signals (i.e., video signals having outline emphasis signals added thereto) that exceed the dynamic range of the camera are uniformly reduced at both the edges of the image signal and the burst-like portions thereof.

Another problem with the aforementioned video cameras is that they generally do not process video signals that are produced from CCD imaging devices having different clock rates. A further problem of existing devices and techniques for gain-adjusting the outline emphasis signal, such as that disclosed with reference to FIGS. 1A to 1C, is that they tend to improperly gain-adjust a spurious high level input signal to produce an exceedingly high output signal that is substantially larger than the adjacent non-spurious signals.

OBJECTS OF THE INVENTION

Therefore, it is an object of the present invention to provide apparatus and method for emphasizing an outline of a video signal which overcome the shortcomings of the above-described devices.

Another object of the present invention is to provide a technique which properly emphasizes an outline of a video signal having burst-like portions therein.

A further object of the present invention is to provide apparatus and method for emphasizing an outline of a video signal produced from imaging devices having different clock rates.

An additional object of this invention is to provide a technique for properly emphasizing an outline of a video signal having spurious high signals therein.

Various other objects, advantages and features of the present invention will become readily apparent to those of ordinary skill in the art and the novel features will be particularly pointed out in the appended claims.

SUMMARY OF THE INVENTION

In accordance with one embodiment of the present invention, apparatus and method are provided for generating a first detail signal which represents a detail of a video image represented by a video signal (e.g., generated by an imaging device), detecting edges in the video image and detecting burst portions of the video signal, generating an edge detection signal corresponding in a first manner to the detected edges in the video image and generating an edge detection signal corresponding in a second manner different from the first manner to the detected burst portions of the video signal, adjusting the first detail signal in accordance with the generated edge detection signal (e.g., by multiplying the first detail signal and the generated edge detection signal), and modifying the video signal in accordance with the adjusted detail signal (e.g., by adding the second detail signal to the video signal) to produce an outline emphasized video signal.

As one aspect of the present invention, the edge detection signal only corresponds to the detected edges in the video image and does not correspond to the detected burst portions of the video signal.

As another aspect of the present invention, the edge detection signal represents gain values less than one when it corresponds to the detected edges and represents a unit gain value when it corresponds to the detected burst portions, and portions of the first detail signal corresponding to portions of the edge detection signal representing gain values less than one are reduced, and portions of the first detail signal corresponding to portions of the edge detection signal representing the unit gain value are not reduced.

In accordance with another embodiment of the present invention, apparatus and method are provided for generating at least one detail signal which represents a detail of a video image represented by a video signal, filtering the vertical outline emphasis signal of the detail signal in accordance with a clock rate of the video signal to produce a cross color suppression signal representing a sub-carrier frequency component of the vertical outline emphasis signal, adjusting the detail signal in accordance with the generated cross color suppression signal (e.g., by subtracting the cross color suppression signal from the detail signal) and modifying the video signal in accordance with the adjusted detail signal to produce an outline emphasized video signal.

As one aspect of this embodiment of the present invention, the vertical outline emphasis signal is filtered in accordance with a first filter characteristic when the video signal corresponds to a first clock rate, and the vertical outline emphasis signal is filtered in accordance with a second filter characteristic when the video signal corresponds to a second clock rate, thus providing a cross color suppression signal representing a sub-carrier frequency component of the vertical outline emphasis signal generated from a video signal having either the first or second clock rate.

In accordance with a further embodiment of the present invention, apparatus and method are provided for generating at least one detail signal which represents a detail of a video image represented by a video signal, generating a gain setting signal corresponding to the vertical outline emphasis signal of the detail signal, the gain setting signal having reduced levels therein when corresponding portions of the vertical outline emphasis signal are low relative to other portions of the vertical outline emphasis signal, adjusting the detail signal in accordance with the gain setting signal, and modifying the video signal in accordance with the adjusted detail signal to produce an outline emphasized video signal.

As one aspect of this embodiment, minimum ones of adjacent pixels of the vertical outline emphasis signal are selected to produce the gain setting signal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 9 is a block diagram of edge detector 150 as well as a portion of horizontal detail filter 130 shown in FIG. 3 in accordance with the present invention;

FIG. 10 is a block diagram of edge detection circuit 160 shown in FIG. 9;

FIGS. 11A–11G show various waveforms and which are used for explaining the operation of edge detection circuit 160;

FIGS. 14A–14C are waveform diagrams also used for explaining the operation of detecting edges in accordance with the present invention;

FIGS. 15A and 15B are waveform diagrams further used for explaining the process of detecting edges in accordance with the present invention;

FIGS. 18A–18D are waveform diagrams used for explaining the operation of minimum value extraction circuit 173 shown in FIG. 17.

DETAILED DESCRIPTION OF CERTAIN PREFERRED EMBODIMENTS

Figure 2A:
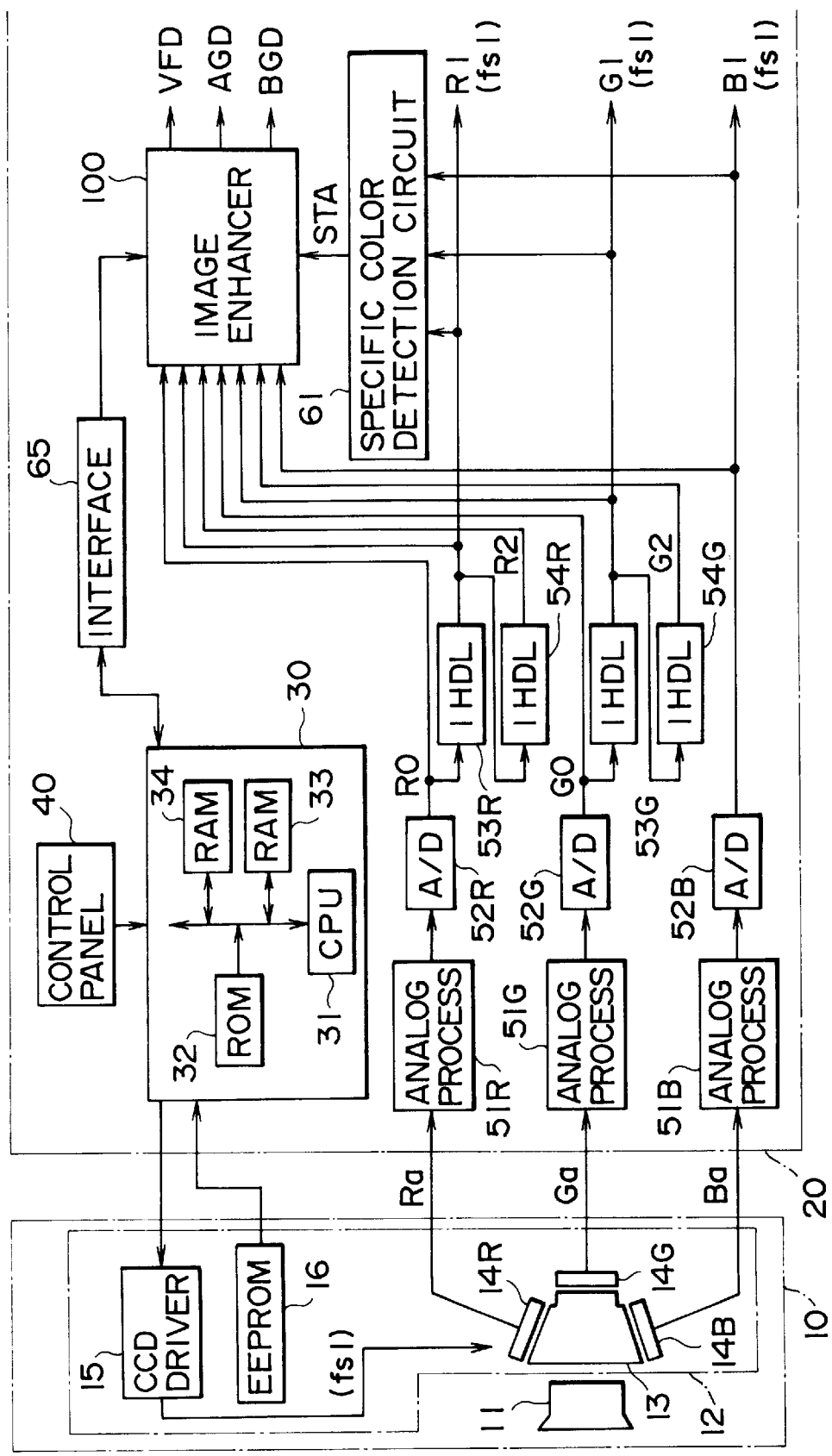
FIGS. 2A and 2B are block diagrams of a video camera embodying the outline emphasis apparatus of the present invention.
Figure 2B:
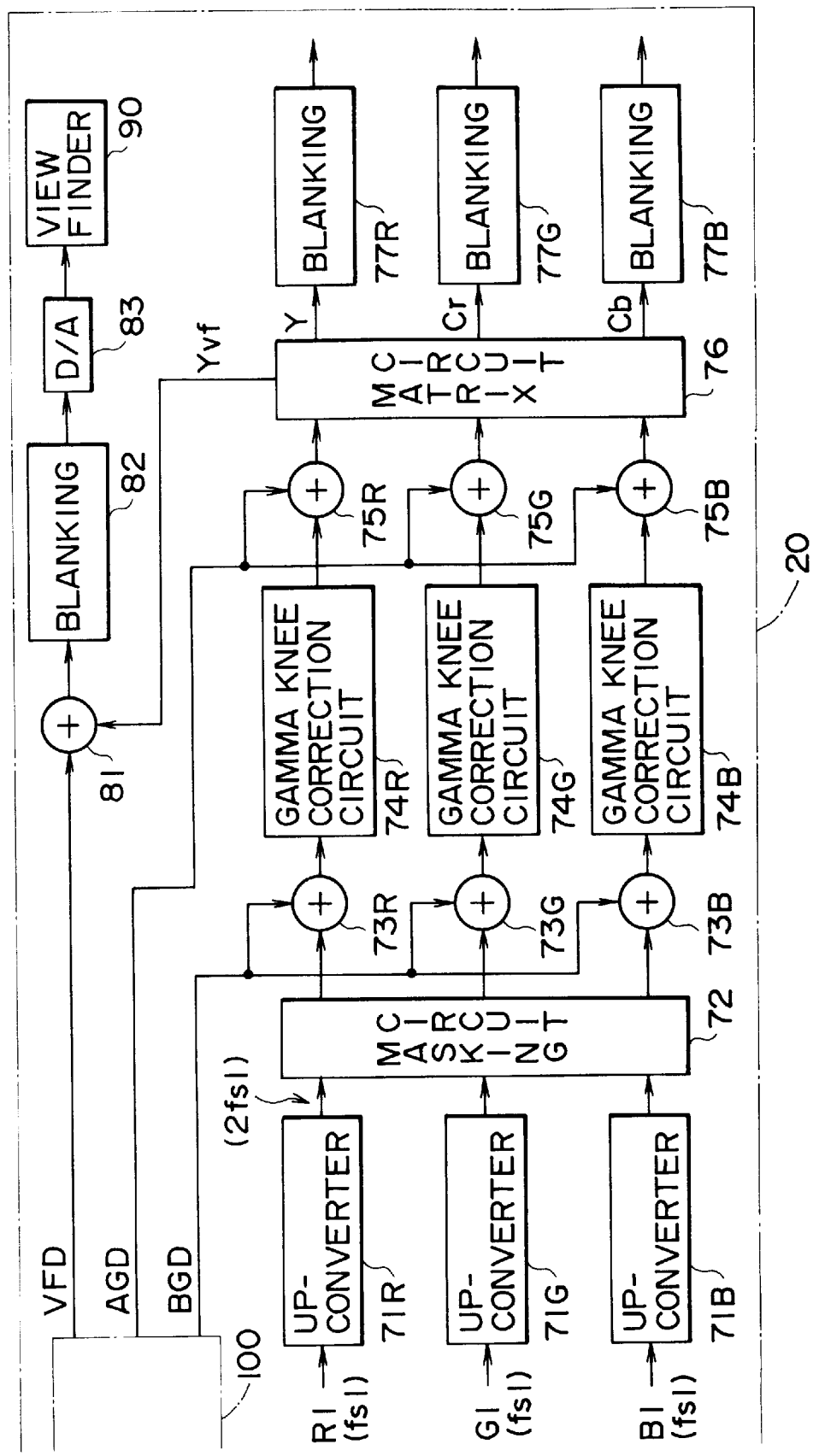

Referring now to FIGS. 2A and 2B of the drawings, a block diagram of a video camera embodying the outline emphasis apparatus of the present invention is shown. The video camera shown in FIGS. 2A and 2B is comprised of an image sensing unit 10 and a camera body 20, wherein image sensing unit 10 is electrically coupled to the camera body 20, but which may be detached therefrom and which are coupled together in any manner known in the art. Image sensing unit 10 is comprised of an imaging lens 11 in which images are received and an imaging block 12 which is comprised of a color splitting prism 13, CCD solid-state image sensing devices 14R, 14G and 14B, a CCD driver 15, and an EEPROM (electrically erasable programmable read-only memory) 16. Color splitting prism 13 divides the light received by image lens 11 into red, green and blue components which are respectively supplied to CCD image sensors 14R, 14G and 14B. The three CCD imaging devices are driven by CCD driver 15 and respectively produce red, green and blue image signals. EEPROM 16 stores various data to be further discussed.

As will be further discussed, CCD imaging devices 14R, 14G and 14B each may be comprised of 400,000 picture elements or 500,000 picture elements, wherein data stored in EEPROM 16 identifies the number of picture elements of each CCD imaging device. In addition, CCD imaging device 14B (also identified herein as "the B channel CCD imaging device") is shifted vertically by an amount of one pixel relative to the R and G channel CCD imaging devices 14R and 14G.

Camera body 20 is comprised of a control unit 30, a control panel 40, analog process circuits 51R, 51G and 51B, analog to digital (A/D) converters 52R, 52G and 52B, delay circuits 53R, 53G, 54R, and 54G, an interface circuit 65, a specific color detection circuit 61, an image enhancer 100, rate converting circuits 71R, 71G and 71B, masking circuit 72, adding circuits 73R, 73G, 73B, 75R, 75G, 75B and 81, gamma knee correction circuits 74R, 74G and 74B, matrix circuit 76, blanking circuits 77R, 77G, 77B, and 82, digital to analog (D/A) converter 83 and a viewfinder 90.

Control unit 30 is comprised of a central processing unit (CPU) 31, a read only memory (ROM) 32, and random access memories (RAM) 33 and 34. CPU 31 controls the operation of image sensing unit 10 (to be discussed) using program data stored in ROM 32 and using RAM 33 as a "work area". When image sensing unit 10 is electrically coupled to camera body 20 and power is supplied thereto, the data stored in EEPROM 16, including data indicating the number of pixels of the CCD imaging devices, are read from EEPROM 16 by control unit 30 and stored in RAM 34. Using the read data, control circuit 30 supplies an appropriate control signal to CCD driver 15 which subsequently drives CCD imaging devices 14R, 14G and 14B. Accordingly, when each of the CCD imaging devices is comprised of 400,000 picture elements (or pixels), CCD driver 15 is controlled to drive the imaging devices at the clock rate of approximately 14.3 MHz (i.e., clock rate "fsl"=14.318 MHz), and when each of the imaging devices is comprised of 500,000 pixels, CCD driver 15 is controlled to drive the CCD devices at the clock rate of approximately 18 MHz (i.e., fsl=18.00 MHz).

Control unit 30 further supplies appropriate control signals and clock signals to the various components of camera body 20, to be further discussed. Control panel 40 is provided to allow a user to enter particular setting data, identified herein as control port data, as well as various commands to be performed by the video camera.

Red, green and blue signals output from CCD imaging devices 14R, 14G and 14B, respectively, are supplied to camera body 20 and specifically to analog processing circuits 51R, 51G and 51B, respectively, which process the respective signals in various manners, including reducing reset noise by means of correlation duplex sampling (CDS), in a manner well known in the art. Analog processing circuits 51R, 51G and 51B supply the respective processed analog signals to A/D converters 52R, 52G and 52B which sample the respective signals at the clock rate fsl=14.3 MHz or at the clock fsl=18 MHz, depending on the number of pixels in the CCD imaging devices 14R, 14G and 14B, as controlled by CPU 31. The sampled signals are converted to respective red, green and blue digital video signals.

The digitized R channel image signal (R0) output from A/D converter 52R is supplied both to image enhancer 100 and to delay circuit 53R which delays red image signal R0 by one horizontal line to produce red delayed image signal R1. Red delayed signal R1 is supplied both to image enhancer 100 and to delay circuit 54R which delays signal R1 by one horizontal line to produce the red delayed (i.e., twice delayed) image signal R2 which is supplied to image enhancer 100. Similarly, green signal G0 output from A/D converter 52G is supplied both to image enhancer 100 and to delay circuit 53G which delays the green video signal by one horizontal line to produce green delayed image signal G1, and green delayed signal G1 is supplied both to image enhancer 100 and to delay circuit 54G which delays signal G1 by one horizontal line to produce delayed signal G2 which is supplied to image enhancer 100.

Digitized blue image signal B1 output from A/D converter 52B is supplied directly to image enhancer 100. In addition, red delayed image signal R1, green delayed image signal G1 and blue image signal B1 all are supplied to specific color detection circuit 61 and are supplied to respective rate (up) converters 71R, 71G and 71B (shown in FIG. 2B), to be further discussed. As previously discussed, the B channel CCD imaging device 14B is vertically shifted by one pixel relative to the R and G channel CCD imaging devices 14R and 14G and, thus, blue image signal Ba output from CCD imaging device 14B is delayed by an amount of one horizontal period relative to the red and green image signals Ra and Ga output from CCD imaging devices 14R and 14G, respectively. Since the red and green digital image signals R0 and G0 output from A/D converters 52R and 52G, respectively, are delayed by one horizontal period prior to being supplied to color detection circuit 61 and up converters 71R and 71G, the red and green image signals coincide with the supply of the blue image signal B1 output from A/D converter 52B.

Image enhancer 100 generates from the supplied image signals R0, R1, R2, G0, G1, G2 and B1, as well as a specific color detection signal STA (to be discussed), detail signals BGD, AGD and VFD (also called herein as outline emphasis signals). As will be described, detail signal BGD is added to each of the red, green and blue image signals prior to gamma knee correction, detail signal AGD is added to each of the red, green and blue image signals after gamma knee correction, and detail signal VFD is added to a view finder image signal. Each of the detail signals AGD, BGD and VFD have a clock rate fs2 twice that of the image signal (i.e., fs2=2fsl).

Specific color detection circuit 61 generates from the supplied image signals R1, G1 and B1, specific color detection signal STA that indicates the occurrence of a specific color, e.g., a human skin color, in the supplied image signal. Signal STA is comprised of a plurality of bits, having a maximum value to indicate the non-occurrence of the particularly detected color, having a minimum value to indicate the occurrence of the particularly detected color, and having middle values between the minimum and maximum values to indicate transitional colors such as occurs at the edge of, for example, the skin when the human skin color is being detected.

Interface 65 is coupled to both control unit 30 and image enhancer 100 and supplies various control signals to image enhancer 100.

Image signals R1, G1 and B1 are supplied to respective rate converters 71R, 71G and 71B which produce respective digital video signals having a clock rate twice that of the supplied video signals R1, G1 and B1. That is, the clock rate of the up converted signals is fs2=28.6 MHz when the original image signals have a clock of 14.3 MHz, and the clock rate of the up-converted signals is fs2=36 MHz when the original clock rate is 18 MHz. The up-converted video signals (2fs) are supplied to masking circuit 72 which performs color correction on the up-converted video signals in a manner well known in the art, and the color corrected red, green and blue video signals are supplied to respective adders 73R, 73G and 73B which operate to add to the respective video signals detail signal BGD supplied from image enhancer 100. Adders 73R, 73G and 73B supply the respective resultant video signals to respective gamma knee correction circuits 74R, 74G and 74B which perform gamma knee correction on the respectively supplied signals in a manner well known in the art. The gamma knee corrected red, green and blue video signals are supplied to respective adder circuits 75R, 75G and 75B which operate to add detail signal AGD output from image enhancer 100 thereto. The output of adders 75R, 75G and 75B are supplied to matrix circuit 76 which generates therefrom a brightness signal Y, red and blue difference signals Cr and Cb, and a view finder brightness signal Yvf (in a manner well known in the art). Brightness signal Y and red and blue difference signals Cr and Cb are supplied to respective blanking circuits 77R, 77G and 77B which add blanking signals thereto and the resultant video signals are supplied as an output to, for example, a video tape recorder (not shown).

Adder circuit 81, to which view finder brightness signal Yvf is supplied, adds detail signal VFD supplied from image enhancer 100 to signal Yvf and supplies the resultant signal to blanking circuit 82 which adds blanking signals thereto and the resultant video signal then is converted to an analog signal in D/A converter 83 and displayed on view finder 90.

Figure 3:
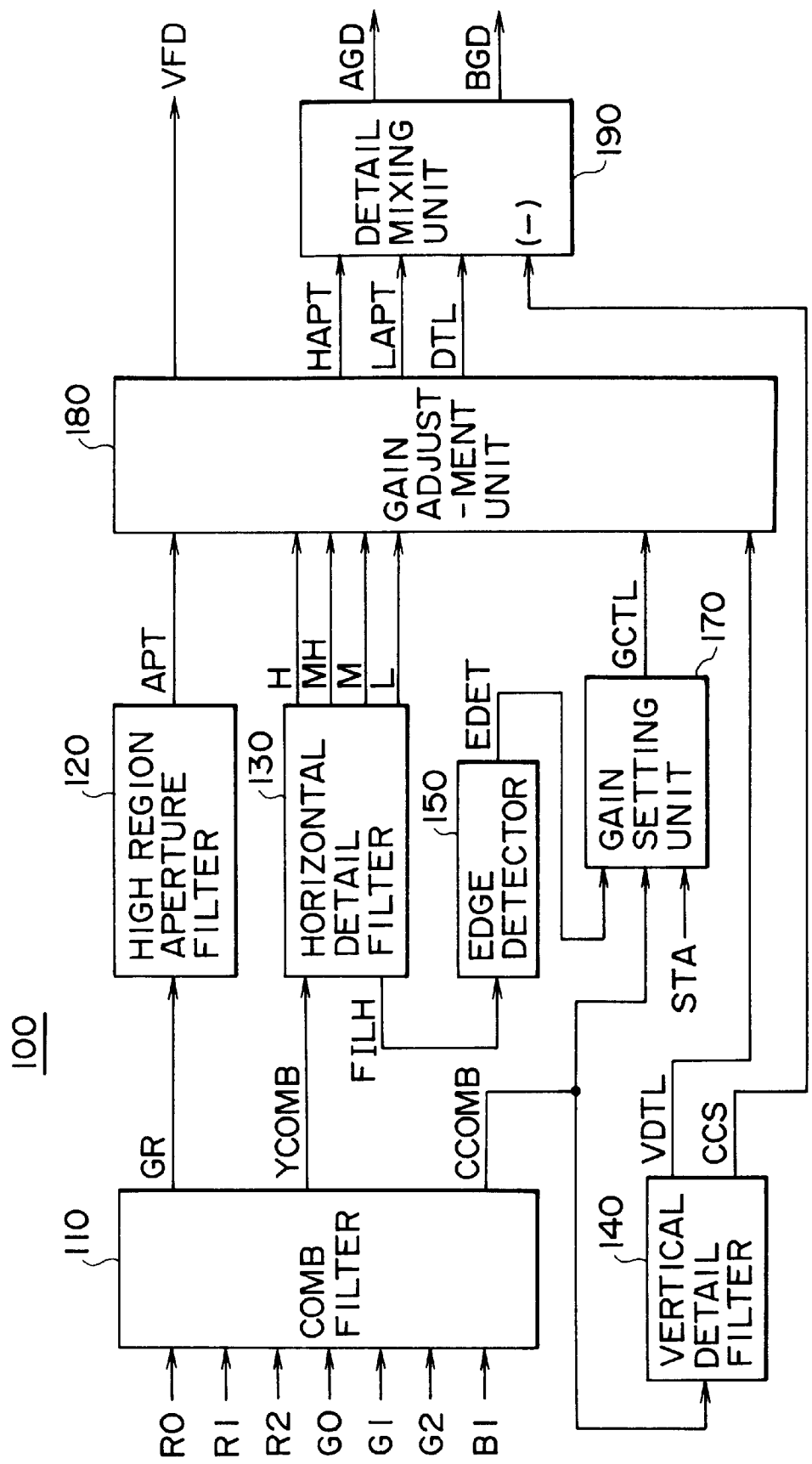
FIG. 3 is a block diagram of image enhancer 100 shown in FIG. 2A in accordance with the present invention.

Referring next to FIG. 3, a block diagram of image enhancer 100 is shown. As shown, image enhancer 100 is comprised of a comb filter 110, a high region aperture filter 120, a horizontal detail filter 130, a vertical detail filter 140, an edge detector 150, a gain setting unit 170, a gain adjustment unit 180 and a detail mixing unit 190. Video signals R0, R1, R2, G0, G1, G2 and B1 supplied to image enhancer 100, as previously discussed, are supplied to comb filter 110 which produces therefrom a high region aperture signal GR (i.e., a highest region horizontal detail signal), a horizontal detail signal YCOMB, which provides horizontal detail from the high region to the low region, and a vertical detail signal CCOMB (also identified herein as the vertical outline emphasis signal), which is used for vertical detail by means of line interpolation. Comb filter 110 generates high region aperture signal GR by multiplexing the various signals supplied thereto in accordance with the function shown in equation 1, wherein coefficient Kgr, Kg, Kr, Kb are chosen in accordance with the values of the aforementioned control data supplied by the user and MPX indicates time divisional multiplexing.

$$GR = KgrxMPX[\{(G1/2)+(G0+G2)/4\} \times (1+Kg), \{(R1/2)+(R0+R2)/4\} \times (1+Kr)+B1 \times Kb] \quad (1)$$

It is to be noted that the value of signal GR as shown in equation 1 represents the case when a control port data APCOMB, having the length of one bit, is zero, but signal GR is produced directly by multiplexing image signals G1 and R1, which do not pass through the comb filter, when data APCOMB is 1.

Horizontal detail signal YCOMB represents detail from the high region to the low region and is produced by multiplexing the G channel after it has been passed through the comb filter and the R channel after it has been passed through the comb filter at the clock rate of fsl, and which is similar to signal GR when data APCOMB is zero. Thus, the value of YCOMB is shown in equation 2, wherein coefficient Ky is chosen in accordance with the data entered at the control panel.

$$YCOMB = KyxMPX[\{(G1/2)+(G0+G2)/4\} \times (1+Kg), \{(R1/2)+(R0+R2)/4\} \times (1+Kr)+B1 \times Kb] \quad (2)$$

Vertical detail signal CCOMB is generated by line interpolation of the G and R channel image signals, and is generated in accordance with equation 3, shown below. The G channel signal is extracted by means of a low pass filter having the construction (101), and wherein coefficient Kc in FIG. 3 is chosen in accordance with the values of the control port data.

$$CCOMB = \{(G1/2)-(G0+G2)/4\} \times LPF(101) \times (\tfrac{1}{2})+(1+Kc) \times \{(R1/2)-(R0+R2)/4\} \quad (3)$$

Figure 4:
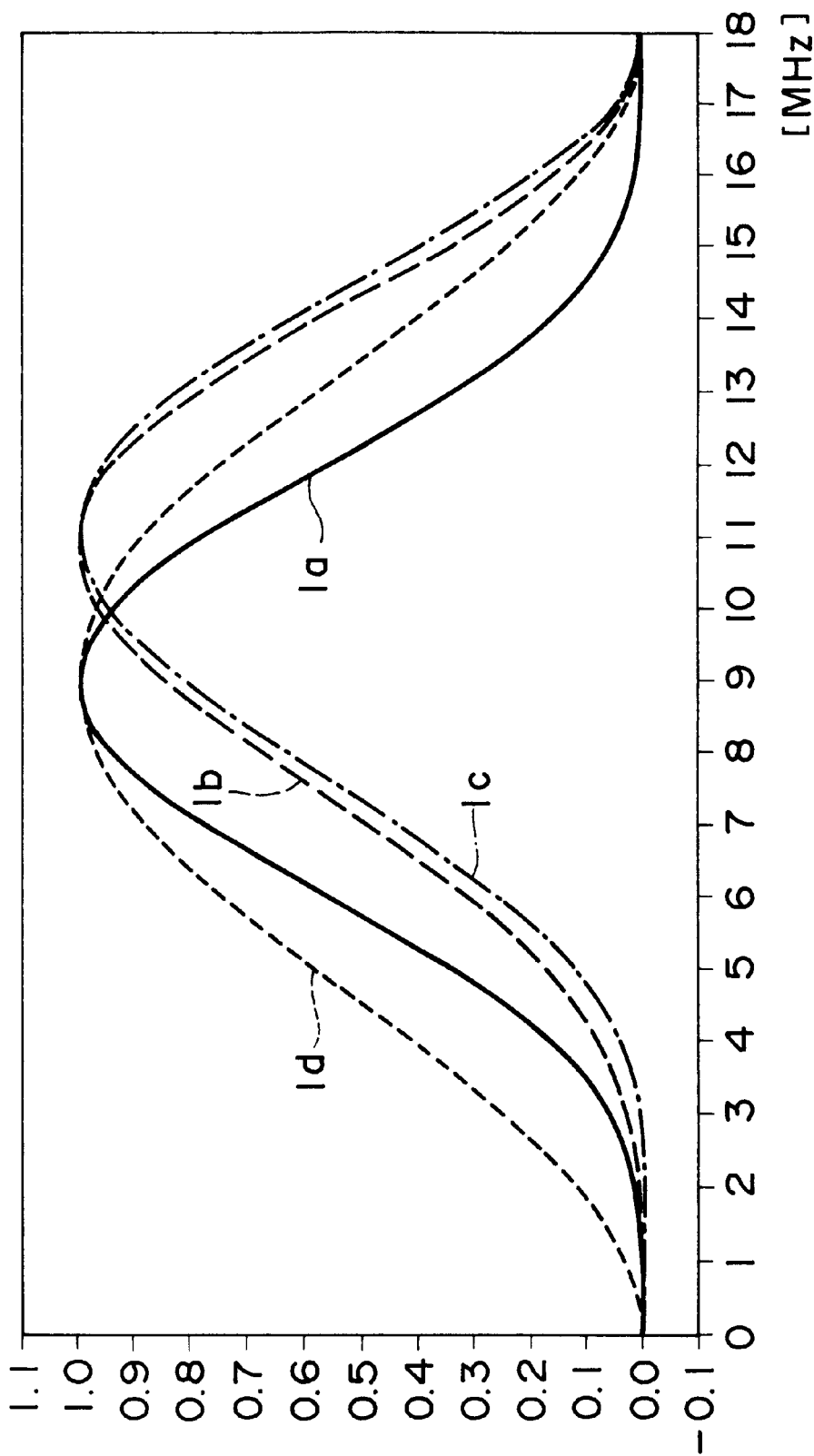
FIG. 4 are waveform diagrams of the filter characteristics of high region aperture filter 120 shown in FIG. 3.

High region aperture filter 120 is a high-pass filter is which generates from signal GR one of four different types of high region aperture signals APT depending on the particular filter characteristic selected by the user. The four different filter characteristics are shown in FIG. 4 wherein lines 1a, 1b, 1c and 1d therein correspond to a filter which produces an APT value shown in equations 4, 5, 6 and 7, respectively.

$$APT = GRx(-1020-1) \times (-1020-1) \quad (4)$$

$$APT = GRx(-1020-1) \times (-12-1) \quad (5)$$

$$APT = GRx(-1020-1) \times (-47-4) \quad (6)$$

$$APT = GRx(-1020-1) \quad (7)$$

Figure 5:
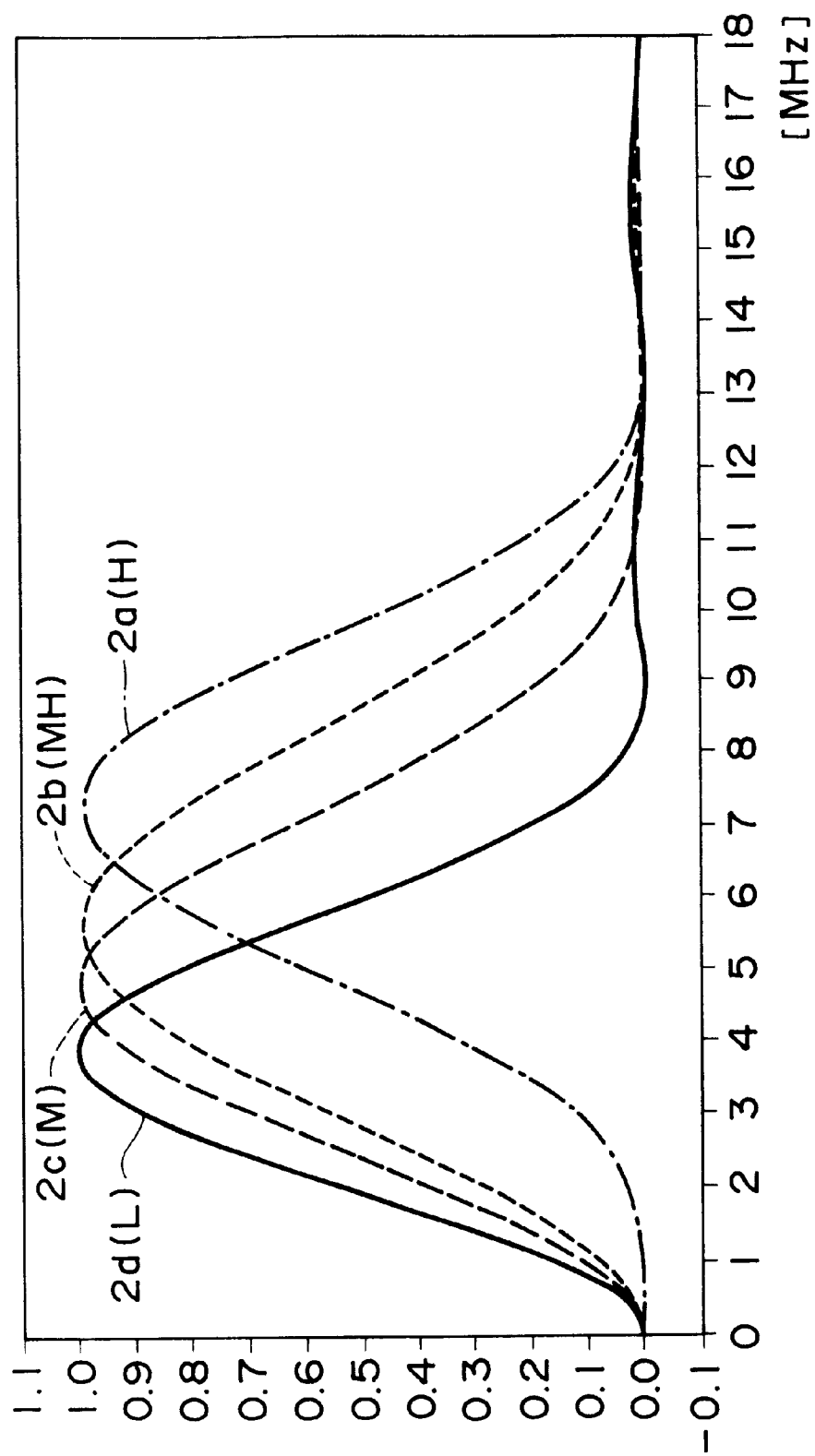
FIG. 5 are waveform diagrams showing the filter characteristics of horizontal detail filter 130 shown in FIG. 3.

Horizontal detail filter 130 generates from signal YCOMB a high region horizontal detail signal H, a mid-high region horizontal detail signal MH, a mid-region horizontal detail signal M, and a low-region horizontal detail signal L. The characteristics of the four filters in horizontal detail filter 130 producing signals H, MH, M and L are shown in FIG. 5 as waveforms 2a, 2b, 2c and 2d, respectively, and which are also represented by equations 8–11.

$$H = YCOMB \times (-1020--1) \times (585) \times (565) \times (-12-1) \quad (8)$$

$$MH = YCOMB \times (-1020-1) \times (585) \times (565) \quad (9)$$

$$M = YCOMB \times (-1020-1) \times (585) \times (111) \times (111) \quad (10)$$

$$L = YCOMB \times (-1020-1) \times (585) \times (111) \times (101) \times (101) \quad (11)$$

Figure 6:
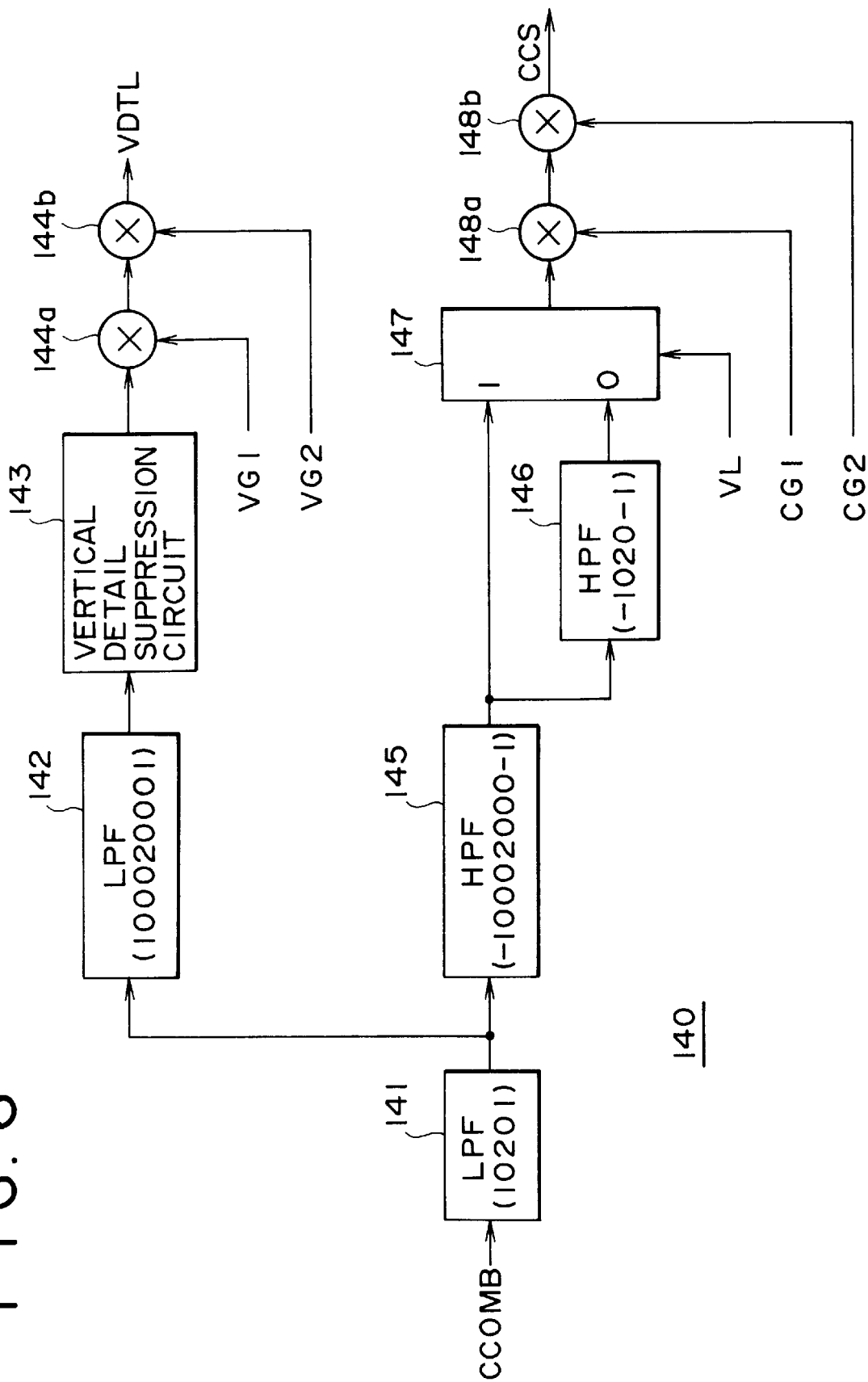
FIG. 6 is a block diagram of vertical detail filter 140 shown in FIG. 3 in accordance with the present invention.

Vertical detail filter 140 generates from signal CCOMB a vertical detail signal VDTL and a cross-color suppression signal CCS. Vertical detail filter 140 in accordance with the present invention has the block structure as shown in FIG. 6 and is comprised of low pass filters (LPF) 141 and 142, high pass filters (HPF) 145 and 146, vertical detail suppression circuit 143, selector 147, and gain adjusting circuits 144a, 144b, 148a and 148b. Signal CCOMB is supplied to low pass filter 141 having the composition (10201) and the output thereof is supplied to low pass filter 142, having the composition (100020001), as well as to high pass filter 145, which has the composition (−10002000−1). After signal CCOMB is supplied to low pass filters 141 and 142, the resultant filtered signal is supplied to vertical detail suppression circuit 143 and subsequently to gain adjusting circuits 144a and 144b to produce vertical detail signal VDTL. Vertical detail signal VDTL may be expressed by equation 12, wherein the Vs is the suppression ratio of vertical detail suppression circuit 143, and Va and Vb are gain factors of gain adjustment circuits 144a and 144b, respectively.

$$VDTL = CCOMB \times [(10201) \times (100020001) \times Vs] \times VaxVb \quad (12)$$

Gain factor Va may be adjusted between the values from 0 to 1 with 256 steps therebetween as indicated by the control port data, and gain factor Vb is set either to 0, ½, 1 or 2, also depending upon the control port data.

Figure 7:
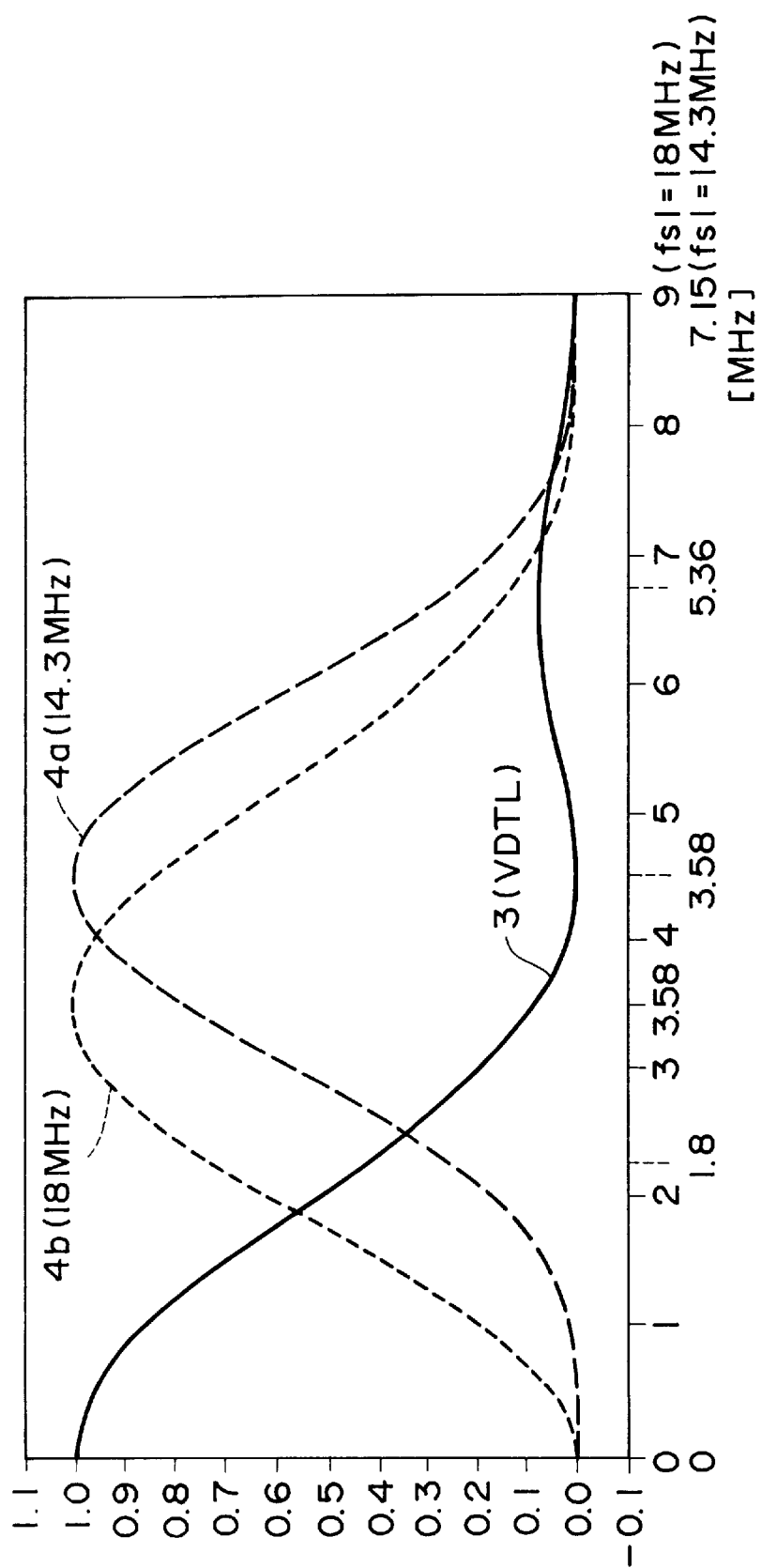
FIG. 7 are waveform diagrams illustrating the filter characteristic of vertical detail filter 140.

In accordance with the present invention, the combined characteristics of low pass filters 141 and 142 remain the same regardless of whether the clock rate of the input data fsl=14.3 MHz of whether fsl=18 MHz (i.e., regardless of whether the CCD imaging devices 14R, 14G and 14B have 400,000 pixels or 500,000 pixels). FIG. 7 illustrates the characteristic of output signal VDTL for either clock rate as the solid line.

Figure 8:
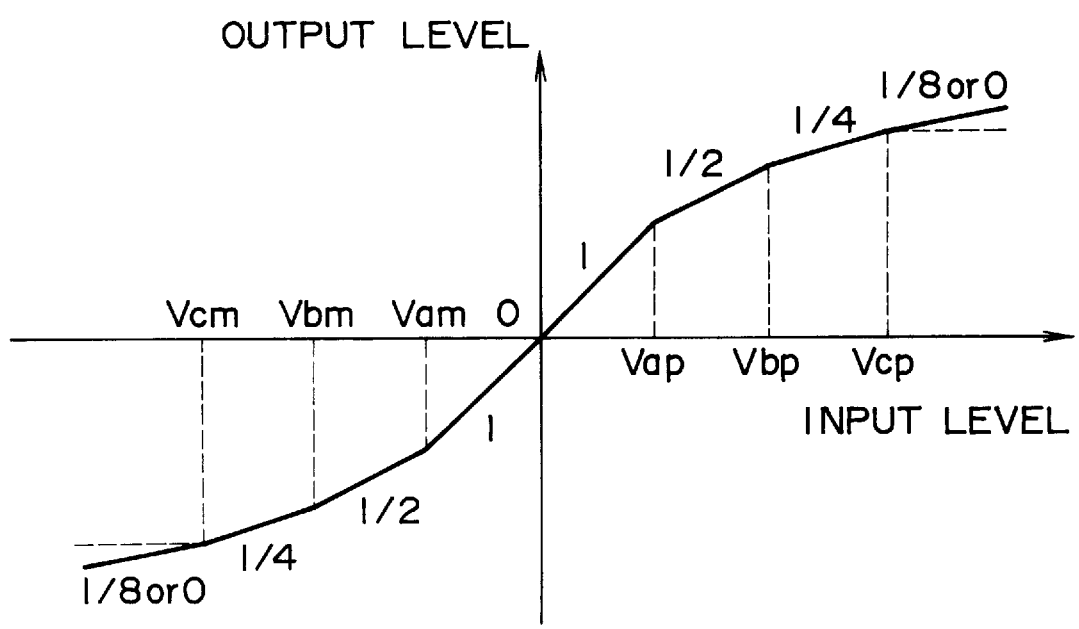
FIG. 8 is a waveform diagram representing the suppression characteristic of vertical detail suppression circuit 143 shown in FIG. 6.

Vertical detail compression circuit 143 has a compression characteristic shown in FIG. 8 and that has a slope of the output level that changes relative to the input level at three different points Vap, Vbp, and Vcp on the positive side (level) and at three points Vam, Vbm, and Vcm on the negative side of the input level. Points Vap, Vbp, Vcp, Vam, Vbm, and Vcm all may be independently set to one of 256 values (i.e., varied in 256 incremental steps) within the range of 0 to 110% and which is controlled by the control port data, and wherein the slopes between points Vcp and Vcm are selectable to be between ⅛ and 1 also as indicated by the control port data.

Signal CCOMB is supplied to low pass filter 141 and the output thereof is supplied to high pass filter 145, as previously mentioned, and the output of high pass filter 145 is supplied both to high pass filter 146 and to selector 147. High pass filters 145 and 146 extract an auxiliary carrier frequency component (also identified as a sub-carrier frequency component) in the vertical detail signal and have the compositions of (−0002000−1) and (−1020−1), respectively. The output of high pass filter 146 is supplied to selector 147 and, in response to the control port data (1 bit) VL, selector 147 supplies either the output of high pass filter 145 (supplied to terminal 1) or the output of high pass filter 146 (supplied to terminal 0) to gain adjusting circuit 148a. The selected signal is gain adjusted in circuits 148a and 148b so as to produce the cross-color suppression signal CCS.

Selector 147 selects the output of high pass filter 146 when the CCD imaging devices 14R, 14G and 14B each is comprised of 400,000 pixels (i.e., the clock rate fsl=14.3 MHz), and selects the output of high pass filter 145 when CCD imaging devices 14R, 14G and 14B each is comprised of 500,000 pixels (i.e., the clock rate fsl=18 MHz). Equations 13 and 14 represent the value of signal CCS when the clock rate fsl=14.3 MHz and fsl=18 MHz, respectively.

$$CCS=CCOMB \times [(10201) \times (-10002000-1) \times (-1020-1)] \times CaxCb \quad (13)$$

$$CCS=CCOMB \times [(10201) \times (-10002000-1)] \times CaxCb \quad (14)$$

Gain factors Ca and Cb in equations 13 and 14 represent the gain factors of gain adjustment circuits 148a and 148b, respectively, wherein gain Ca is adjusted in 16 increments (steps) from 0 to 1 as indicated by the control port data (CG1), and gain factor Cb is set to equal either 0, ½, 1 or 2, depending on the value of control port data CG2. FIG. 7 illustrates as the dashed lines the two filter characteristics of vertical detail filter 140 producing signal CCS, wherein waveform 4a represents the characteristic for the case when the clock rate fsl=14.3 MHz, and waveform 4b represents the characteristic of the filter when the clock rate fsl=18 MHz. As shown, the auxiliary carrier frequency component (i.e., the sub-carrier frequency component) is maximized at both clock rates.

As will be discussed, cross-color suppression signal CCS output from vertical detail filter 140 is subtracted from the detail signal (to be discussed) in detail mixing unit 190 (FIG. 3) and thus the extraction of the auxiliary carrier frequency component in vertical detail filter 140 operates to suppress this component in the detail signal. Also, and as will be discussed, gain signal AGD is generated by adding or multiplexing signals HAPT, LPT and DTL, and signal BGD is generated from the addition or multiplexing of signals LPT and DTL reduced by signal CCS. As previously mentioned, signal AGD is added to the respective video signals after gamma knee correction, and signal BGD is added to each of the video signals before gamma knee correction. From the foregoing, it is seen that the auxiliary carrier frequency component in the vertical detail signal is suppressed at either of the two clock rates of the video signal, and that cross-color interference is substantially reduced in the output image of the video camera.

Edge detector 150 (FIG. 3) operates to distinguish edges of the video image from burst-like portions of the video signal. Portion BU of signal VDS, shown in FIG. 11A (to be further discussed), represents an example of the above-mentioned "burst-like" signal, and portion ED of signal VDS includes two edges which are detected by edge detector 150. In accordance with the present invention, a detection signal is generated which lowers the gain relative to the horizontal detail signal, wherein that lowered gain pertains to the edge portions ED of the image signal corresponding to, for example, the boundary between a "flat" part on the black level side and a flat part on the white level side of the image signal.

Figure 1C:
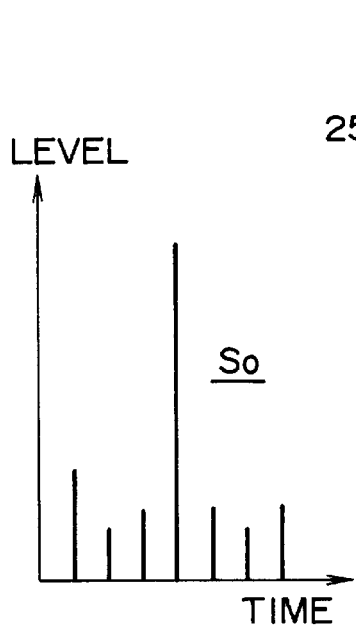
FIGS. 1A–1C are waveform diagrams illustrating a known gain-adjusting technique to outline emphasize a video signal.
Figure 1B:
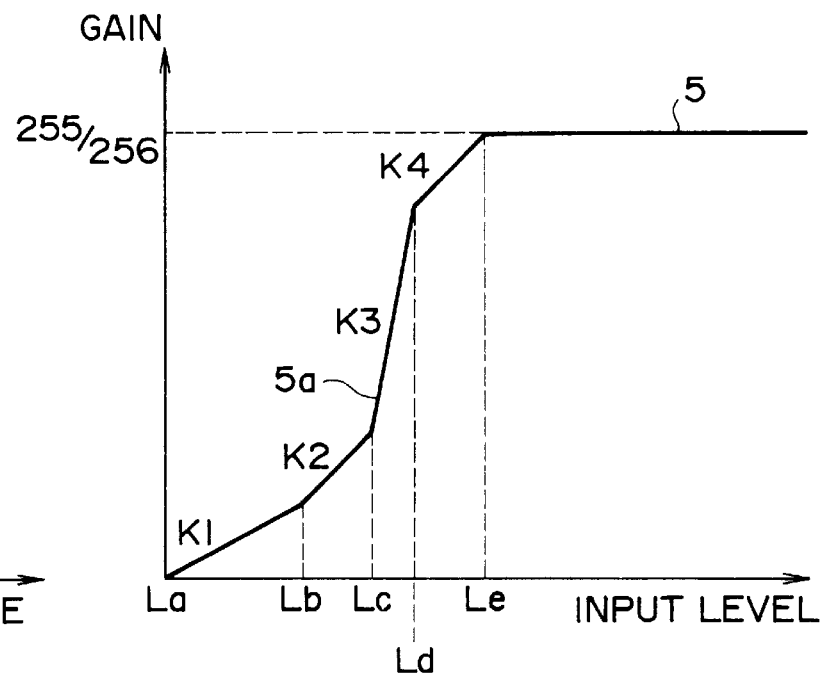
Figure 1A:
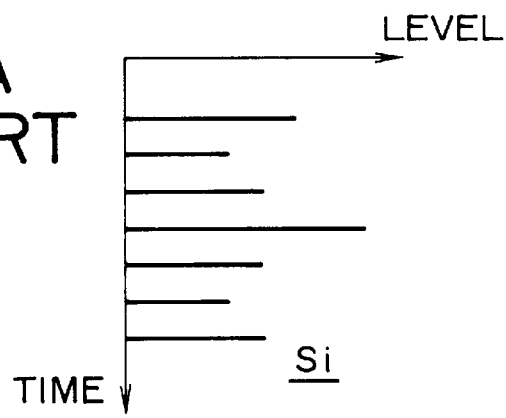

FIG. 9 is a block diagram of edge detector 150 and additionally shows a portion of horizontal detail filter 130. Edge detector 150 is comprised of an absolute value circuit 151, a delay circuit 152, a maximum value selection circuit 153, an edge detection circuit 160, a time width expansion circuit 154, a compression circuit 155, an inverter 156, and a low pass filter 157. Horizontal detail filter 130 includes a high pass filter 131 which generates from signal YCOMB (previously discussed) (also shown as signal VDS in FIG. 11A) a high region component signal FILH. As previously mentioned, signal VDS may include a burst-like portion BU (the term "burst-like" is used to distinguish it from a burst signal in a color synchronizing signal), and includes edges ED of an image portion of the video signal. Furthermore, while image signal VDS is shown in the drawings as an analog waveform, signal VDS preferably is a digital signal representing the analog signal, for example, shown in FIG. 11A. Signal FILH, representing the high region component of signal VDS, is shown in FIG. 11B and is supplied to absolute value circuit 151 which produces therefrom an absolute value signal ABSO, such as shown in FIG. 1C. Signal ABSO is supplied to maximum value selection circuit 153 as well as to delay circuit 152 which delays (i.e., latches) the supplied signal and which supplies a delayed signal to the other input of maximum value selection circuit 153. Maximum value selection circuit 153 selects the larger of the two supplied values producing signal MAXO, such as shown in FIG. 11D. Signal MAXO is supplied to edge detection circuit 160 which detects edges therein (to be discussed) and which produces a detection signal DETO, such as shown in FIG. 11E, and signal DETO is supplied to time width expansion circuit 154. Time width expansion circuit 154 expands the supplied signal in the time direction to produce signal EXPO, shown in FIG. 11F, which is supplied to compression circuit 155. The signal is level compressed in compression circuit 155, is inverted in inversion circuit 156, and then supplied through low pass filter 157 to produce edge detection signal EDET, as shown in FIG. 11G.

FIG. 10 is a block diagram of edge detection circuit 160 which, as shown, is comprised of delay elements (or flipflops) 161A–161H, maximum value selection circuits 162, 163 and 165, minimum value selection circuit 164, selector 166, delay 167 and subtraction circuit 168. Absolute value signal MAXO supplied to edge detection circuit 160 is supplied to the first latch 161A and to maximum value selection circuit 162. Maximum value selection circuit 162 supplies as an output the maximum of the three inputs corresponding to the inputs of delay elements 161A, 161B and 161C, and maximum value selection circuit 163 supplies as an output the maximum value of the supplied inputs corresponding to the outputs of delay elements 161F, 161G and 161H. Maximum value selection circuit 165 supplies to selector circuit 166 the maximum of the outputs of circuits 162 and 163, and minimum value selection circuit 164 supplies to selector circuit 166 the minimum of the outputs of circuits 162 and 163. Selector 166, in response to signal SEL, supplies either the minimum value output from circuit 164 or the maximum value output supplied from circuit 165. As will be understood, when selector circuit 166 supplies the output of maximum value selection circuit 165 to delay element 167, edge detection circuit 160 operates to detect edges in the image portion and not to detect the edges of the burst-like portion BU of signal VDS. However, when selector circuit 166 supplies the output of minimum value selection circuit 164 to delay element 167, edge detection circuit 160 operates to detect the edges of the burst-like signal and not to detect edges in the edge portions (non burst-like portions) of the image signal. The output of selector circuit 166 is supplied to delay element 167 which delays the supplied signal by one clock period and supplies the delayed signal to subtraction circuit 168. In addition, the output of delay element 161E is supplied to subtraction circuit 168 which operates to subtract therefrom the output of delay element 167 so as to produce signal DETO shown in FIG. 11E.

Furthermore, the output of delay element 161D in FIG. 10 is supplied (in addition to being supplied to delay element 161E) as a "center" or main value, and it is determined whether this main value has the same value as one the three inputs of maximum value selection circuit 162 or one of the three inputs of maximum value selection circuit 163. If the main value is the same value as one of the indicated signals, subtraction circuit 168 is controlled to supply a low (zero) output since such a result indicates that an edge portion is not detected. On the other hand, if the main value is not the same as any of the indicated signals, substraction circuit 168 operates to control subtraction circuit 168 to supply a high level indicating that an edge portion is detected. In addition, if the output of delay element 16D is an edge portion of a burst-like signal, one of the signals supplied to maximum circuit 165 may have a different value than the output of delay element 161D. Accordingly, when the output of circuit 165 is selected (in selector 166), the maximum supplied value, i.e., the same value as the output of delay element 161D, is output. Thus, subtraction circuit 168 supplies a low output, which indicates the edge portion of the burst-like signal is not to be identified as an edge portion of the image. On the other hand, if output of minimum circuit 164 is selected by selector 166, subtraction circuit 168 supplies a high output.

Figure 12:
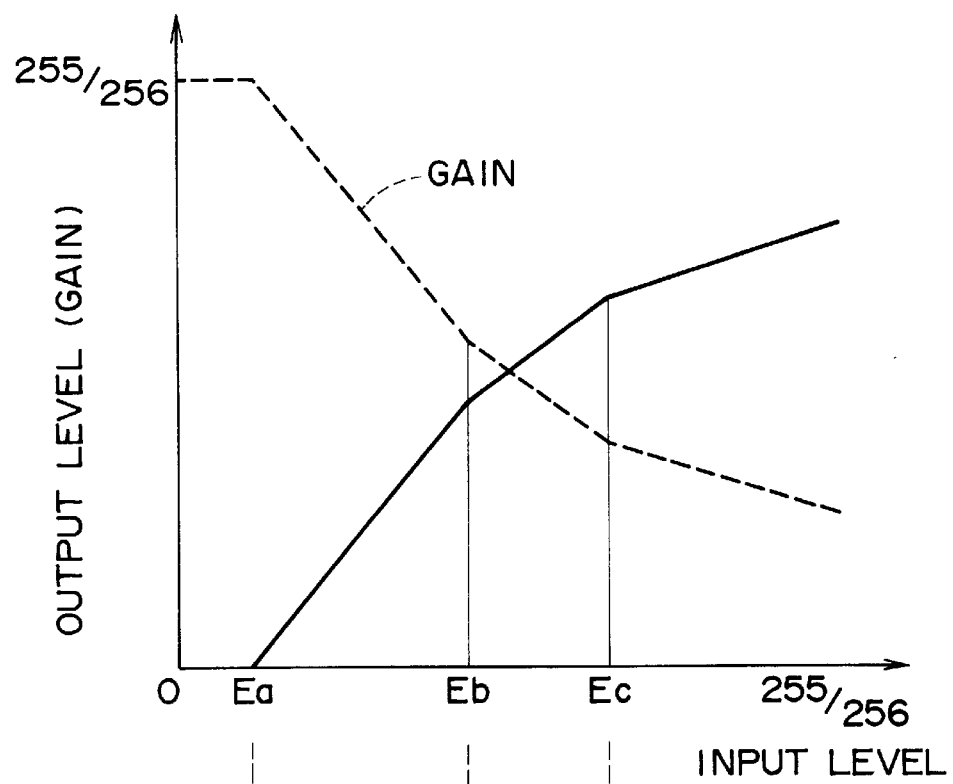
FIG. 12 illustrates a detection characteristic of edge detection circuit 160.

In the disclosed example, signal DETO represents the case when the output of maximum value selection circuit 165 is selected. Signal DETO then is supplied to time width expansion circuit 154 which produces therefrom signal EXPO shown in FIG. 11F, as previously mentioned, but when time width expansion is performed in circuit 154, a relative phase adjustment also may be applied to the supplied signal. Signal EXPO then is supplied to compression circuit 155 which has an input/output compression slope as shown in FIG. 12. As shown, the slope of the output level varies relative to the input level at the three points Ea, Eb and Ec of the input level (represented by the solid line), wherein points Ea, Eb and Ec are independently controlled by the values of the control port data. Referring next to FIG. 14A, video signal VDS is comprised of a burst-like portion BU and another portion having different levels and the resultant generated detail signal DTLS, shown in FIG. 14B, is produced by multiplying the originally generated detail signal with edge detection signal EDET supplied from edge detector 150 shown in FIG. 14C. When the maximum value output of circuit 165 is selected, it is seen that there is no gain in the burst-like portion BU of the video signal, but there exists a gain value (less than 1) for the edges of the non burst-like portion.

Figure 13:
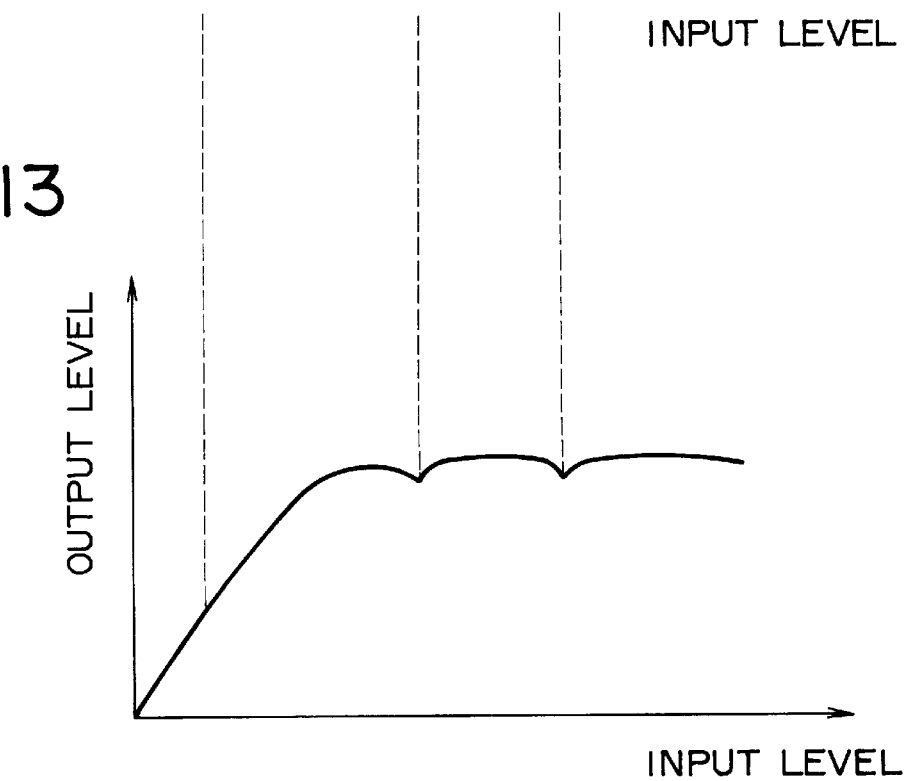
FIG. 13 is another waveform used for explaining the operation of detecting an edge in accordance with the present invention.

Referring back to FIG. 3, edge detection signal EDET is supplied from edge detector 150 to gain setting unit 170 which, and as will be discussed, is supplied to gain adjustment unit 180 which multiplies therein the detail signal by the edge detection signal EDET. FIG. 13 illustrates the input/output characteristic resulting from the multiplication of edge detection EDET with the detail signal.

FIG. 15A illustrates an exemplary image signal having a detail signal added thereto in which the detail signal is not generated by the edge reducing technique of the present invention. As shown in FIG. 15A, the edges of the signal exceed the dynamic range and are clipped thus resulting in a broad outline at the edges of the video image. On the other hand, by detecting edges in the video signal in edge detector 150 and producing therefrom edge detection signal EDET which is multiplied by the produced detail signal, the addition of the detail signal to the video signal results in a signal that does not exceed the dynamic range such as shown in FIG. 15B, and thus portions therein are not clipped.

Figure 16A:
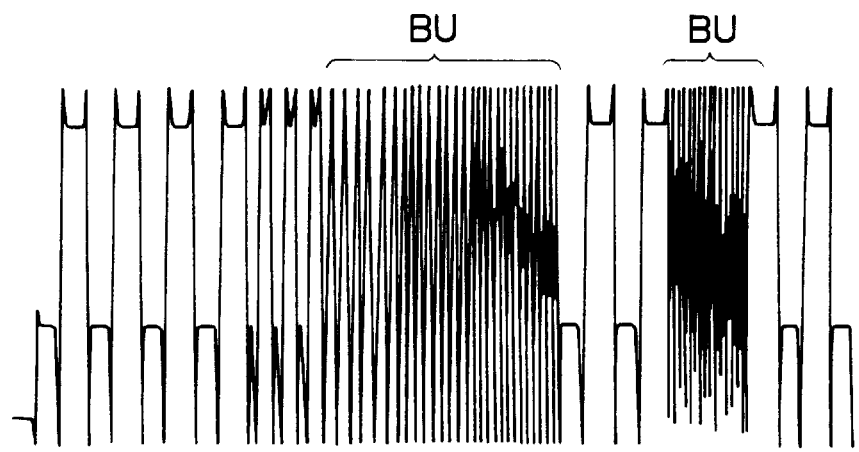
FIGS. 16A and 16B are still yet another pair of waveform diagrams used for explaining the process of detecting edges of present invention.
Figure 16B:
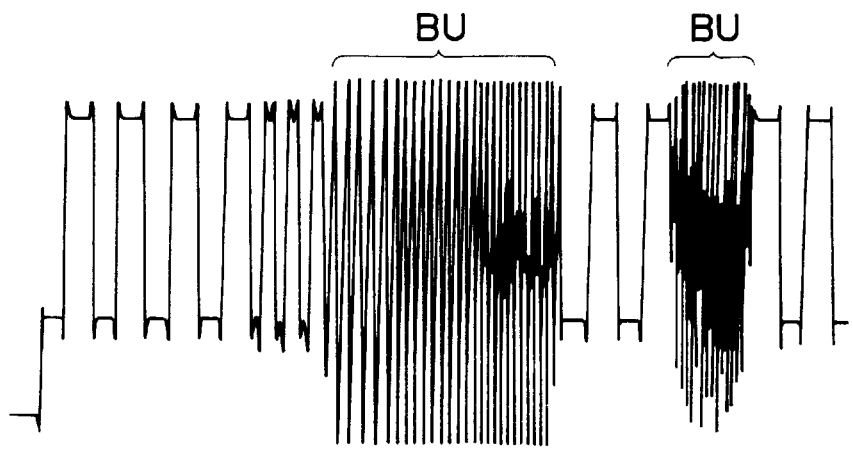
Figure 17:
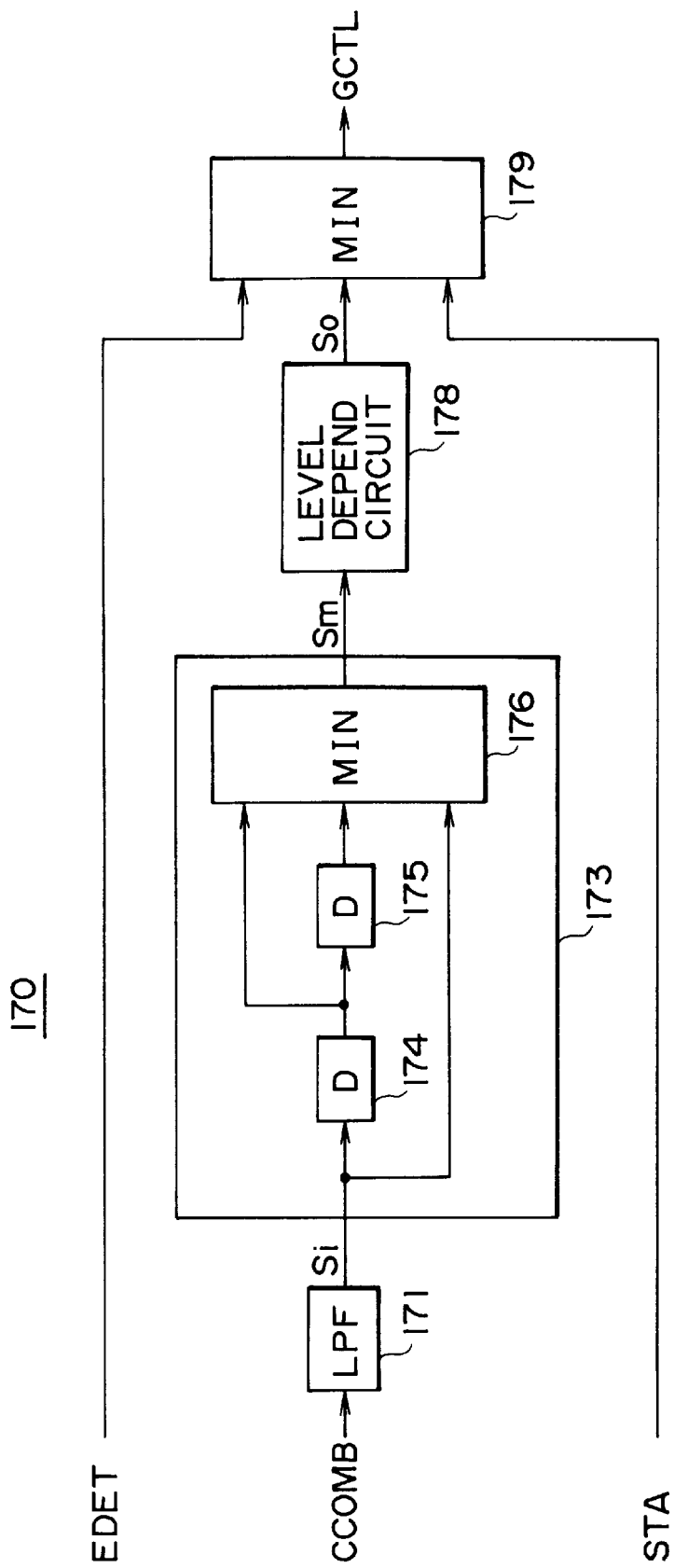
FIG. 17 is a block diagram of gain setting unit 170 shown in FIG. 3 in accordance with the present invention.

Furthermore, edge detector 150 operates to detect edges in the video image but to not detect edges in the burst-like portions thereof and, thus, the detailed signal of the burst-like portions of the video signal is unaffected. FIGS. 16A and 16B illustrate this aspect of the present invention, wherein FIG. 16A represents a waveform in which edges of a burst-like portion and edges of non burst-like portions of a video signal are not distinguished from one another, and FIG. 16B illustrates when the two types of edges are distinguished from one another in accordance with the present invention. FIG. 16B further shows the case when the minimum value output of circuit 164 (FIG. 10) is selected. Gain setting unit 170, shown in FIG. 3, sets the gain relative to the detail signal and compresses the detail signal level when the level of the original image signal is relatively small in accordance with the present invention. Referring to FIG. 17, a block diagram of gain setting unit is shown. Signal CCOMB supplied to gain setting unit 170 is supplied to low pass filter 171 which extracts a low region component Si therefrom and which supplies the low region component Si to a minimum value extraction circuit 173. Minimum value extraction circuit operates to suppress the level of the detail signal when the level of signal Si is relatively small. Signal Si is supplied to delay element 174 and then to delay element 175. The minimum value of signal Si, delayed signal Si (output from delay element 174), and twice delayed signal Si (output from delay element 175) is selected in minimum value selection circuit 176 and the selected signal is supplied as minimum value signal Sm to level depend circuit 178. FIG. 18A represents an exemplary input signal Si supplied to minimum value extraction circuit 173, and FIG. 18B represent minimum value signal Sm output from minimum value extraction circuit 173. As shown, signal Sm1 is the minimum value of signals Si1, Si2, and Si3, signal Sm2 is the minimum value of signals Si2, Si3 and Si4, etc. Thus, signals having a high level, e.g., signal Si4, do not occur in the output signal. Minimum value signal Sm is supplied to level depend circuit 178 which has the suppression characteristic as shown in FIG. 18C, wherein the slope of the gain relative to input level changes for the sequences K1, K2, K3 and K4 at the respective input level points Lb, Lc, and Ld. Input levels La, Lb, Lc, Ld and Le are set in accordance with the control port data, and slopes K1–K4 are set by other control port data. In addition, a plus or minus 7% offset of minimum value signal Sm supplied to level depend circuit 178 is set by further control port data, and input level LE at which the signal is fully compressed also may be varied. Level depend circuit 178 produces from minimum value signal Sm an output signal So, as shown in FIG. 18D. As previously mentioned, output signal Sm contains no high level signals thus producing an output signal So having no high level signals. Further, and as will be discussed, when output signal So is supplied to gain adjustment unit 180, and subsequently multiplied by the detail signal, the resultant detail signal will have no large fluctuations of values therein and thus noise is not produced at the camera output.

Gain setting unit 170 further includes a minimum value selection circuit 179 which selects the minimum value of the supplied input signals edge detection EDET, output signal So, and specific color detection signal STA. The output of minimum value selection circuit 179 is supplied as a gain setting signal GCTL to gain adjustment unit 180.

Specific color detection signal STA, as previously discussed, has a minimum value of, for example, zero, for those image portions having a specific color and, thus, gain setting signal GCTL is zero when signal STA is zero and, therefore, outline emphasis is not performed.

Figure 19A:
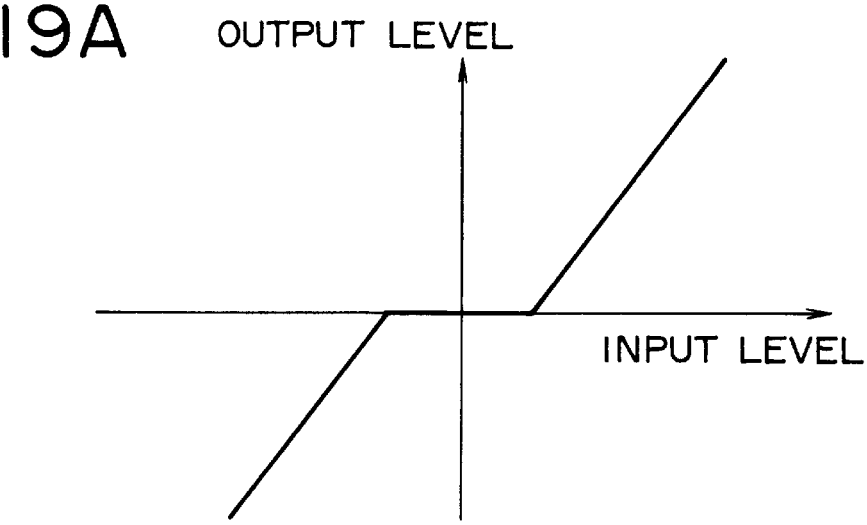
FIGS. 19A–19C are waveform diagrams showing the various mixing characteristics of detail mixing unit 190 shown in FIG. 3.
Figure 19B:
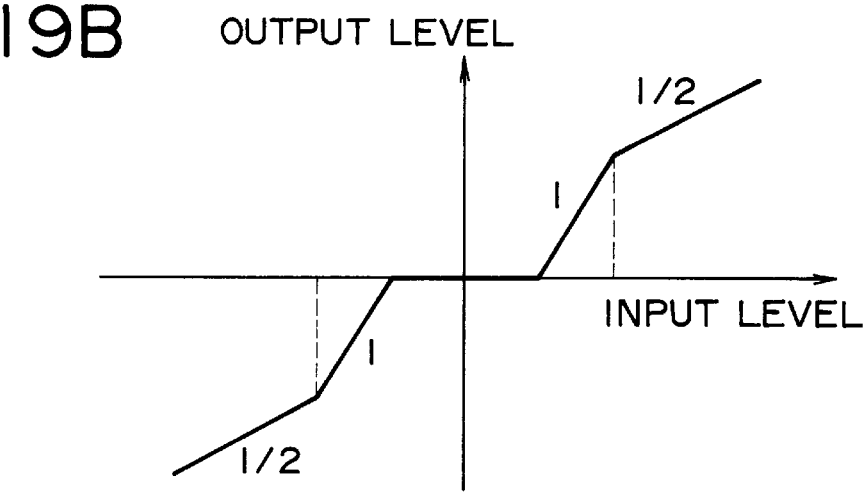

Referring again to FIG. 3, gain adjustment unit 180 generates high region aperture signal HAPT by processing high region aperture signal APT (supplied from filter 120) in accordance with the control characteristics shown in FIG. 19A and multiplies the resultant thereof by gain setting signal GCTL supplied from gain setting unit 170. Gain adjustment unit 180 further generates a low region aperture signal LAPT from the detail signals, H, MH, M and L supplied from horizontal detail filter 130 and signal GCTL by adding each of the detail signals H, MH, M, L together, processing the result thereof using the characteristic process shown in FIG. 19B, and multiplying the result thereof by gain setting signal GCTL.

Figure 19C:
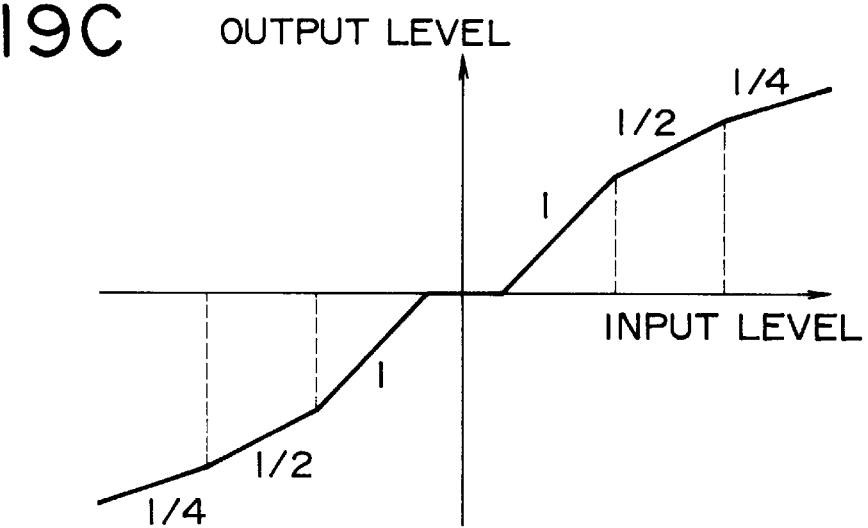

Gain adjustment unit 180 further generates from the supplied signals a detail signal DTL by adding the detail signals H, MH, M and L to signal VDTL supplied from vertical detail filter 140, processing the result thereof using the characteristics shown in FIG. 19C, and multiplying the processed result by gain setting signal GCTL. Finally, gain adjustment unit 180 produces from the supplied signals a view finder detail signal VFD by adding the medium high region horizontal detail signal MH or adding the low region horizontal detail signal L to the vertical detail signal VDTL, performing a process having the characteristics shown in FIG. 19A on the result thereof and multiplying the processed signal by gain setting signal GCTL.

Detail mixing unit 190 operates to add the low region aperture signal LAPT to the detail signal DTL, subtract from this value the cross color suppression signal CCS so as to produce detail signal BGD which, as previously discussed, is added to the R, G and B video signals prior to gamma knee correction (see FIG. 2B). Detail mixing unit 190 further operates to add the high region aperture signal HAPT, the low region aperture signal LAPT and the detail signal DTL together to produce detail signal AGD which is added to each of the R, G and B video signals after gamma knee correction. In addition, gain factors may be added to each of the signals in detail mixing unit 190.

The generation of cross color suppression signal CCS has been previously described with reference to FIG. 6 of the drawings. Further, after signal CCS has passed through a low pass filter having the composition (121) and through a low pass filter having a composition (343) when fsl equals 14.3 MHz, and through a low pass filter having a composition (232) when fsl equals 18 MHz, such is performed to suppress any increase in the signal at 3/4 FSL and 5/4 FSL.

While the present invention has been particularly shown and described in conjunction with preferred embodiment thereof, it will be readily appreciated by those of ordinary skill in the art that various changes may be made without departing from the spirit and scope of the invention. For example, while particular circuits have been described as performing various operations, the present invention is now limited solely thereto and may provided using other types of circuits and/or types of signals.

Therefore, it is intended that the appended claims be interpreted as including the embodiments described herein, the alternatives mentioned above, and all equivalents thereto.

What is claimed is:

1. Apparatus for emphasizing an outline of a video signal, comprising:

means for generating horizontal and vertical detail signals, each representing a detail of a video image represented by a video signal;

edge detection means for detecting edges in the video image and for detecting burst portions of the video signal;

edge detection signal generating means for generating an edge detection signal corresponding in a first manner to the detected edges in the video image and corresponding in a second manner to the detected burst portions of the video signal, said first and second manners being different;

gain setting means for receiving said edge detection signal and said vertical detail signal, and based thereupon, generating a gain setting signal;

detail signal adjustment means for adjusting the vertical and horizontal detail signals in accordance with the generated gain setting signal to produce a plurality of second detail signals; and video signal modifying means for modifying said video signal in accordance with the generated second detail signals to produce an outline emphasized video signal.

2. The apparatus of claim 1, wherein said detail signal adjustment means multiplies each of the horizontal and vertical detail signals and gain setting signal to produce the second detail signals.

3. The apparatus of claim 1, wherein said edge detection signal generating means is operable to generate the edge detection signal only corresponding to the detected edges in the video image and not corresponding to the detected burst portions of the video signal.

4. The apparatus of claim 1, wherein said edge detection signal generating means is operable to generate an edge detection signal representing gain values less than one corresponding to the detected edges in the video image, and to generate an edge detection signal representing a unit gain value corresponding to the detected burst portions of the video signal; and said detail signal adjustment means operates to reduce levels of portions of said first detail signal corresponding to portions of said edge detection signal representing gain values less than one, and to not reduce levels of portions of said first detail signal corresponding to portions of said edge detection signal representing said unit gain value.

5. The apparatus of claim 1, wherein said video signal modifying means is operable to add the second detail signals to the video signal to produce the outline emphasized video signal.

6. The apparatus of claim 1, further comprising imaging means for imaging an image to produce said video signal.

7. Method of emphasizing an outline of a video signal, comprising the steps of:

generating horizontal and vertical detail signals, each representing a detail of a video image represented by a video signal;

detecting edges in the video image and detecting burst portions of the video signal;

generating an edge detection signal corresponding in a first manner to the detected edges in the video image and corresponding in a second manner to the detected burst portions of the video signal, said first and second manners being different;

generating a gain setting signal based upon said edge detection signal and said vertical detail signal;

adjusting the horizontal and vertical detail signals in accordance with the generated gain setting signal to produce a plurality of second detail signals; and modifying said video signal in accordance with the generated second detail signals to produce an outline emphasized video signal.

8. The method of claim 7, wherein said detail signal adjustment step is carried out by multiplying each of the horizontal and vertical detail signals and gain setting signal to produce the second detail signals.

9. The method of claim 7, wherein said edge detection signal generating step is carried out by generating the edge detection signal only corresponding to the detected edges in the video image and not corresponding to the detected burst portions of the video signal.

10. The method of claim 7, wherein said edge detection signal generating step is carried out by generating the edge detection signal representing gain values less than one when it corresponds to the detected edges in the video image, and representing a unit gain value when it corresponds to the detected burst portions of the video signal; and said detail signal adjustment step is carried out by reducing levels of portions of said first detail signal corresponding to portions of said edge detection signal representing gain values less than one, and by not reducing levels of portions of said first detail signal corresponding to portions of said edge detection signal representing said unit gain value.

11. The method of claim 7, wherein said video signal modifying step is carried out by adding the second detail signals to the video signal to produce the outline emphasized video signal.

12. The method of claim 7, further comprising the step of imaging an image to produce said video signal.

* * * * *